US008477748B2

(12) United States Patent
Shinozaki

(10) Patent No.: US 8,477,748 B2
(45) Date of Patent: Jul. 2, 2013

(54) BASE STATION AND DATA TRANSFER METHOD

(75) Inventor: Atsushi Shinozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 931 days.

(21) Appl. No.: 12/468,274

(22) Filed: May 19, 2009

(65) Prior Publication Data

US 2010/0034181 A1  Feb. 11, 2010

(30) Foreign Application Priority Data

Aug. 7, 2008 (JP) ................................. 2008-204428

(51) Int. Cl.
*H04W 40/00* (2009.01)
(52) U.S. Cl.
USPC .......................................... 370/338; 370/475
(58) Field of Classification Search
USPC ................. 370/338, 356, 355, 395.2, 395.31, 370/475
See application file for complete search history.

(56) References Cited

U.S. PATENT DOCUMENTS

| | | | |
|---|---|---|---|
| 6,192,248 B1 * | 2/2001 | Solondz | 455/450 |
| 7,624,184 B1 * | 11/2009 | Aviani et al. | 709/227 |
| 2002/0058480 A1 * | 5/2002 | Ikeda | 455/67.1 |
| 2005/0030947 A1 * | 2/2005 | Alfano et al. | 370/389 |
| 2006/0101109 A1 | 5/2006 | Nishio | |
| 2006/0193272 A1 * | 8/2006 | Chou et al. | 370/310 |
| 2006/0274669 A1 | 12/2006 | Falck et al. | |
| 2007/0067431 A1 | 3/2007 | Yoshihara et al. | |
| 2007/0287501 A1 | 12/2007 | Hoshina et al. | |
| 2008/0031189 A1 * | 2/2008 | Choi et al. | 370/329 |
| 2009/0055920 A1 * | 2/2009 | Murtagh et al. | 726/12 |
| 2009/0059822 A1 * | 3/2009 | Morrill et al. | 370/310 |
| 2010/0026448 A1 * | 2/2010 | Stephenson et al. | 340/5.2 |
| 2010/0093381 A1 * | 4/2010 | Maguire | 455/466 |

FOREIGN PATENT DOCUMENTS

| | | |
|---|---|---|
| EP | 1 775 976 | 4/2007 |
| JP | 2004-334792 | 11/2004 |
| JP | 2006-525714 | 11/2006 |
| JP | 2007-53530 | 3/2007 |
| JP | 2007-282255 | 10/2007 |
| WO | 2007/015066 | 2/2007 |

OTHER PUBLICATIONS

UPnP Forum; UPnP Device Architecture 1.0; Document Revision Date Jul. 20, 2006. URL: http://www.upnp.org/info/cpyright.asp.

(Continued)

*Primary Examiner* — Thai Nguyen
(74) *Attorney, Agent, or Firm* — Myers Wolin, LLC

(57) ABSTRACT

A base station forms a communication area enabling communication with a mobile communication network through a local network that includes the base station. The base station includes a monitoring unit that monitors an address for data communication with the mobile communication network and assigned to a mobile terminal in the communication area; a storage unit that stores combination information indicating a combination of the address monitored and identification information of the mobile terminal; a receiving unit that receives, from a communication terminal in the local network, data having the identification information; a comparing unit that compares the combination information with a combination of a destination address of the data and the identification information in the data; and a transmitting unit that transmits the data to the mobile terminal if the combination and the combination information coincide, and performs error processing if the combination and the combination information do not coincide.

12 Claims, 15 Drawing Sheets

OTHER PUBLICATIONS

3GPP TS 43.318 V8.0.0 (Nov. 2007); 3rd Generation Partnership Project; Technical Specification Group GSM/EDGE Radio Access Network; Generic Access Network (GAN); Stage 2; (Release 8); Dated: Nov. 2007.

3GPP TR 43.902 V7.0.1 (Aug. 2007); 3rd Generation Partnership Project; Technical Specification Group GSM/EDGE Radio Access Network; Enhanced Generic Access Networks (EGAN) study; (Release 7); Dated: Aug. 2007.

Global Systems for Mobile Communications & 3GPP; 3GPP TS 44.318 V7.4.0 (Sep. 2007); 3rd Generation Partnership Project; Technical Specification Group GSM/EDGE Radio Access Network Generic Access (GA) to the A/Gb interface; Mobile GA interface layer 3 specification; (Release 7); Dated: Sep. 2007.

3GPP TR R3.020 V0.7.0 (May 2008); 3rd Generation Partnership Project; Technical Specification Group Radio Access Network; Home (e)NodeB; Network aspects; (Release 8); Dated: May 2008.

Extended European Search Report with Abstract for corresponding European Patent Application No. 09161565.8, dated Sep. 7, 2007.

* cited by examiner

BASE STATION AND DATA TRANSFER METHOD

CROSS REFERENCE TO RELATED APPLICATIONS

This application is based upon and claims the benefit of priority of the prior Japanese Patent Application No. 2008-204428, filed on Aug. 7, 2008, the entire contents of which are incorporated herein by reference.

FIELD

The embodiments discussed herein are related to a base station and a data transfer method for wireless communication.

BACKGROUND

In recent years, the provision of mobile phone services in a service area by a small base station called a femtocell has been considered. In this scheme, generally, a femtocell gateway (FGW) and a femtocell access point (femto AP) are connected using an internet protocol (IP) broadband line such as an asymmetric digital subscriber line (ADSL) and fiber to the home (FTTH).

Various services to be provided by femtocell service are under consideration, such as the provision of a signal reception environment better than that of a macrocell, a high-speed data communication environment achieved as a result of the better reception environment, and exclusive utilization of a frequency by a user to improve efficiency in frequency utilization as well as lower flat rate service fees charged by mobile phone carriers.

In an environment where a broadband line is available, by a mere connection of a femto AP, femtocell services can be enjoyed. The femto AP is installed at the residence of a user subscribing to the service. Consequently, deregulation in the mobile phone industry is expected, thereby enabling users to freely change the installation place or turn on and off the power of the femto AP.

In addition to providing services having the advantages above, a femtocell scheme can realize a communication link with information terminal home appliances. For example, typically, communication between a personal computer (PC) and a mobile phone is achieved by the use of a memory card or a dedicated communication cable with software as a communication medium. However, operations such as inserting and removing the memory card or communication cable are very troublesome for the user.

On average, every two years, users newly purchase mobile phones to replace existing ones. To transfer files from an existing mobile phone to a newly purchased mobile phone, a user first stores the files in the existing mobile phone on a PC at home. A technique to simplify communication between a mobile phone and a PC is disclosed in Japanese Laid-Open Patent Publication No. 2007-282255.

As a general communication method between a mobile phone and a PC, WiFi (a wireless local area network (LAN) technology) may be considered and a 3GPP mobile terminal equipped with WiFi is actually available. However, such dual terminals have problems in terms of power consumption and cost. As a means to address these problems, wireless communication schemes supported by femtocells are limited to mobile communication schemes (for example, 3GPP).

For the femtocell service, communication at a residence, achieved through the femto AP installed at the residence is assumed between a mobile communication network and a mobile terminal, whereas communication between a PC and a mobile terminal is not assumed basically. Therefore, at a residence, the transmission of a packet from a PC to a mobile terminal is difficult.

The problem is specifically explained. In a regular femtocell service, an address for use in a mobile communication network (mobile communication network address) is given to a mobile terminal each time data communication with respect to the mobile terminal is requested. Because of resource constraints, in mobile communication, an IP address is usually released after the communication has finished. Therefore, when packet transmission from a PC to a mobile terminal is attempted, the current mobile communication network address assigned to the mobile terminal cannot be obtained by the PC.

Even when the PC can obtain the mobile communication network address of the mobile terminal, if the mobile communication network address changes thereafter, the PC transmits a packet having an invalid address and thus, cannot transmit the packet properly to the mobile terminal. Hence, when the mobile communication network address of a mobile terminal changes, communication between a PC and the mobile terminal is difficult.

Therefore, for example, it becomes difficult to achieve Plug and Play (PnP) of the mobile terminal with respect to a local network that is a Universal Plug and Play (UPnP) network. Moreover, when the mobile terminal receives a call, an IP address is assigned by calling the mobile terminal, and therefore, a problem occurs if the IP address retained by the caller is not the IP address recorded in UPnP.

SUMMARY

According to an aspect of an embodiment, a base station forms a communication area enabling communication with a mobile communication network through a local network that includes the base station. The base station includes a monitoring unit that monitors an address assigned to a mobile terminal in the communication area, the address being assigned by the mobile communication network for data communication with the mobile communication network; a storage unit that stores combination information indicating a combination of the address monitored by the monitoring unit and identification information concerning the mobile terminal; a receiving unit that receives, from a communication terminal in the local network, data having the identification information; a comparing unit that compares the combination information stored in the storage unit with a combination of a destination address of the data and the identification information that is included in the data received by the receiving unit; and a transmitting unit that transmits the data received by the receiving unit to the mobile terminal if a result of comparison by the comparing unit indicates that the combination and the combination information coincide, and performs error processing if the result of comparison indicates that the combination and the combination information do not coincide.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to the accompanying drawings.

Figure 1:
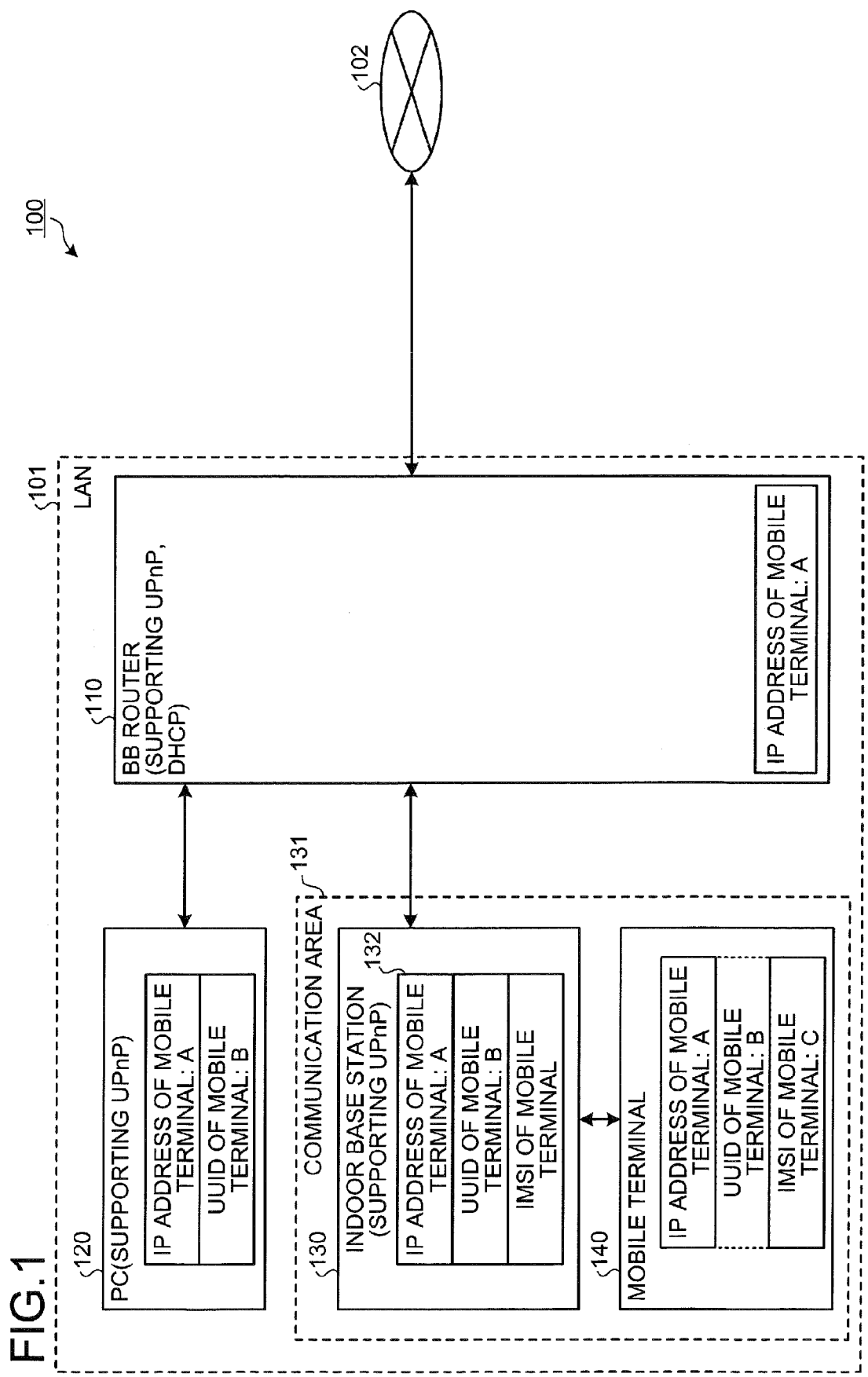
FIG. 1 is a block diagram of a communication system according to a first embodiment of the present invention.

FIG. 1 is a block diagram of a communication system according to a first embodiment of the present invention. As depicted in FIG. 1, a communication system 100 includes a LAN 101 and a mobile communication network 102. The LAN 101 (local network) includes a broadband (BB) router 110, an indoor base station 130, a mobile terminal 140, and a PC 120.

The mobile communication network 102 is connected to the BB router 110 of the LAN 101. In the mobile communication network 102, a femtocell gateway (FGW) is provided. A gateway of the mobile communication network 102 has a function of administering data communication in the mobile communication network 102. Specifically, the gateway of the mobile communication network 102 has a function of issuing a mobile communication network address used for data communication with the mobile communication network 102, and the like.

The BB router 110 is connected to the mobile communication network 102 and further connected to the indoor base station 130 and the PC 120. The connection between the BB router 110 and the indoor base station 130 and the connection between the BB router 110 and the PC 120 may be a wired connection by Ethernet (registered trademark) or the like, or a wireless connection by IEEE802.11 or the like. The indoor base station 130 may be incorporated in the BB router 110.

The PC 120 is a communication terminal having a communicating function. The PC 120 stores an IP address (A) of the mobile terminal 140 and a universal unique identifier (UUID) (B) of the mobile terminal 140. The UUID is identification information that is assigned to the mobile terminal 140 and, at least while the mobile terminal 140 is connected to a UPnP network, does not change.

The PC 120 communicates with the mobile terminal 140 using the IP address (A) and the UUID (B). The PC 120 transmits an IP packet including the UUID (B) to the BB router 110, setting the IP address (A) as the destination. The BB router 110 relays the communication performed within the LAN 101, between the mobile communication network 102 and the PC 120 or the indoor base station 130 in the LAN 101, etc.

For example, the BB router 110 checks the destination address of an IP packet that is transmitted from the PC 120 and addressed to the mobile terminal 140. The BB router 110 transfers the packet transmitted from the PC 120 to the indoor base station 130 if the IP address set as the destination of the IP packet is valid.

The indoor base station 130 is an access point of a femtocell (femto AP) and forms a communication area 131 (femtocell) by emitting electromagnetic waves. The mobile terminal 140 in the communication area 131 can communicate with the mobile communication network 102 through the LAN 101. The indoor base station 130 and the mobile terminal 140 are connected by a wireless interface such as wideband code division multiple access (W-CDMA).

The PC 120 and the mobile terminal 140 can communicate with each other through the indoor base station 130 as an IP network. The BB router 110, the PC 120, and the indoor base station 130 support UPnP. The mobile terminal 140 need not support UPnP.

The indoor base station 130 monitors the IP address assigned to the mobile terminal 140 by the gateway of the mobile communication network 102 to enable data communication between the mobile terminal 140 and the mobile communication network 102. Therefore, even if the IP address of the mobile terminal 140 changes, the indoor base station 130 always has the latest IP address of the mobile terminal 140.

Furthermore, the indoor base station 130 obtains a UUID of the mobile terminal 140. The indoor base station 130 records combination information 132 that indicates a combination of the obtained UUID and the monitored IP address of the mobile terminal 140. In this example, the indoor base station 130 also obtains an international mobile subscriber identity (IMSI) of the mobile terminal 140 and stores the IMSI in combination with the IP address and the UUID of the mobile terminal 140, as the combination information 132.

Moreover, the indoor base station 130 receives an IP packet that is transmitted from the PC 120 and transferred by the BB router. The received IP packet stores therein the UUID as identification information of the mobile terminal 140. The indoor base station 130 compares the combination of the UUID in the received IP packet and the destination address of the IP packet with the combination information 132.

The indoor base station 130 transmits the received IP packet to the mobile terminal 140 if the compared combinations coincide. Thus, when the PC 120 transmits an IP packet addressed to a proper IP address of the mobile terminal 140, the IP packet can be transferred to the mobile terminal 140 by the indoor base station 130.

On the other hand, the indoor base station 130 performs error processing of the compared combinations do not coincide. As such error processing, the indoor base station 130 notifies (through the BB router 110) the PC 120 that the IP address set as the destination of the received IP packet is invalid. In response to this notification, the PC 120 stops the IP packet transmission to the mobile terminal 140. In this case, for example, the PC 120 displays a message informing the user that the IP address in invalid.

Alternatively, as error processing, the indoor base station 130 performs a control to transmit, to the mobile terminal 140, an IP packet that has the same contents as the received IP packet and that is addressed to the IP address combined, in the combination information 132, with the UUID of the mobile terminal 140 in the received IP packet. Thus, an IP packet addressed to the latest IP address of the mobile terminal 140 can be transferred to the mobile terminal 140 when the PC 120 transmits an IP packet addressed to an invalid IP address as the destination.

As error processing, for example, the indoor base station 130 notifies (through the BB router 110) the PC 120 of the IP address that, in the combination information 132, is combined with the UUID of the mobile terminal 140 in the received IP packet, as a new address. Such notification is performed using, for example, generic event notification architecture (GENA).

In response to this notification, the PC 120 stores the new address as the IP address of the mobile terminal 140, and re-transmits an IP packet addressed to the IP address newly stored. The indoor base station 130 transfers the IP packet re-transmitted by the PC 120 to the mobile terminal 140. Thus, an IP packet from the PC 120 and addressed to the proper IP address can be transferred to the mobile terminal 140.

Alternatively, as error processing, the indoor base station 130 transmits, to the mobile terminal 140, a notification instruction instructing to notify the PC 120 of the IP address that, in the combination information 132, is combined with the UUID of the mobile terminal 140 in the received IP packet. The notification instruction is transmitted by, for example, GENA or simple object access protocol (SOAP).

In response to the notification instruction, the mobile terminal 140 informs the PC 120 of the latest IP address assigned thereto. Such notification by the mobile terminal 140 is performed, for example, by notifying the UPnP network including the BB router 110, the PC 120, and the indoor base station 130 of a state change, using simple service discovery protocol (SSDP).

In response to this notification, the PC 120 stores the new address provided by the indoor base station 130 as the IP address of the mobile terminal 140, and re-transmits an IP packet addressed to the IP address newly stored. The indoor base station 130 transfers the IP re-transmitted by the PC 120 to the mobile terminal 140. Thus, an IP packet from the PC 120 and addressed to the proper IP address can be transferred to the mobile terminal 140.

Alternatively, as error processing, the indoor base station 130 may change the destination of the received IP packet to the IP address that, in the combination information 132, is combined with the UUID of the mobile terminal 140 in the received IP packet. The indoor base station 130 transmits, to the mobile terminal 140, the IP packet whose destination has been changed. Thus, an IP packet addressed to the proper IP address can be transferred to the mobile terminal 140.

When communication with the mobile terminal 140 is to be performed, if the mobile terminal 140 is in a state where communication is not possible (in standby, etc.), the indoor base station 130 pages the mobile terminal 140 using the IMSI of the mobile terminal 140 to change the state of the mobile terminal 140 to a communication-enabled state. Thus, a communication path between the indoor base station 130 and the mobile terminal 140 can be established.

The mobile terminal 140 performs position registration when the mobile terminal 140 enters the communication area 131 of the indoor base station 130. Specifically, the communication terminal 140 transmits a position registration request to the indoor base station 130. The position registration request transmitted from the mobile terminal 140 is received by the gateway of the mobile communication network 102 through the indoor base station 130 and the BB router 110. Upon receiving the position registration request, the gateway of the mobile communication network 102 performs position registration of the mobile terminal 140, issues an IP address (a mobile communication network address), and sends the IP address to the mobile terminal 140.

The mobile communication network address is an IP address that is assigned to the mobile terminal 140 for packet communication between the mobile terminal 140 and the mobile communication network 102. The IP address transmitted from the gateway of the mobile communication network 102 is received by the mobile terminal 140 through the BB router 110 and the indoor base station 130. The mobile terminal 140, using the received address as the IP address thereof, performs packet communication with the mobile communication network 102.

Figure 6:
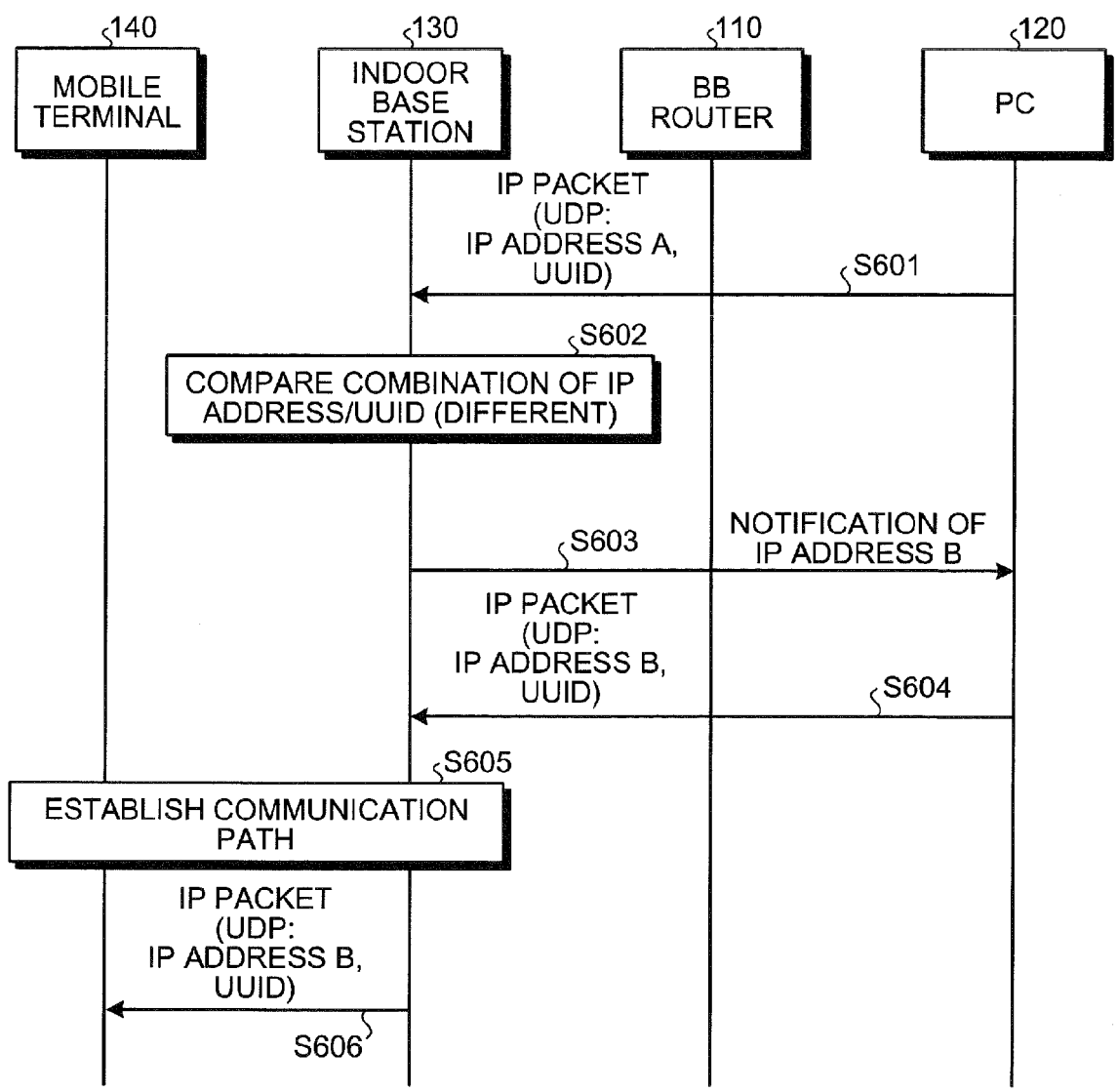
FIG. 6 is a sequence diagram of a first example of a transmission operation (UDP, addresses differing) of the communication system according to the first embodiment.

The mobile terminal 140 keeps the IP address obtained from the mobile communication network 102 until the mobile terminal 140 leaves the communication area 131. Concerning a basic configuration of the communication system 100, a configuration described in Detailed 3G HNB System Architecture, Figure 6.1.2.1-3. of 3GPP TR R3.020 V0.7.0 (2008 May) and the like can be employed. In Figure 6.1.2.1-3., UE corresponds to the mobile terminal 140, 3G HNB corresponds to the indoor base station 130, and HNB-GW corresponds to the gateway of the mobile communication network 102.

Figure 2:
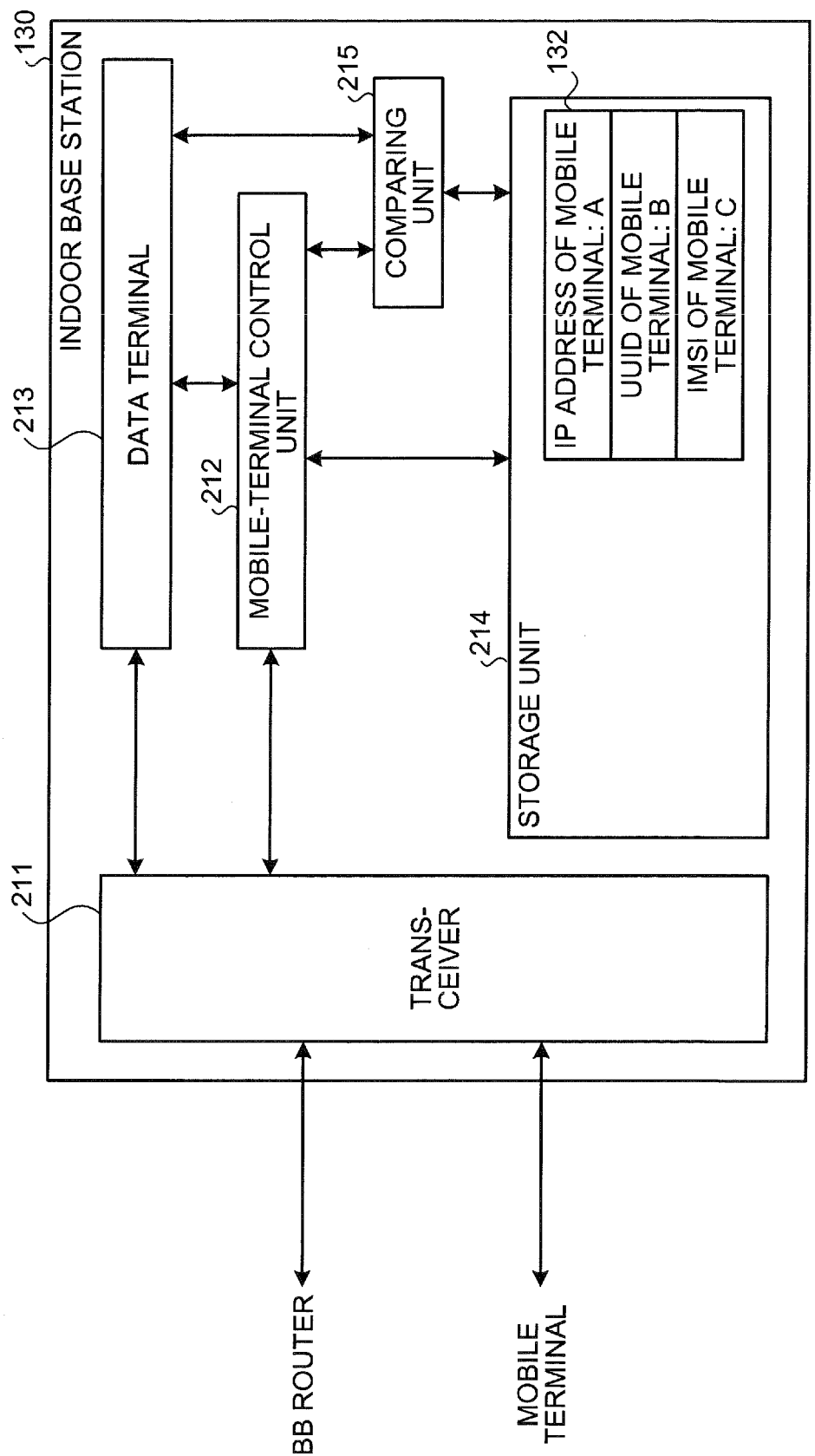
FIG. 2 is a block diagram of the indoor base station depicted in FIG. 1.

FIG. 2 is a block diagram of the indoor base station depicted in FIG. 1. As depicted in FIG. 2, the indoor base station 130 according to the first embodiment includes a transceiver 211, a data terminal 213, a mobile-terminal control unit 212, a storage unit 214, and a comparing unit 215. The respective components are controlled by a control unit not depicted.

The transceiver 211 is an interface that performs communication between the BB router 110 and the mobile terminal 140. The transceiver 211 is connected to and communicates with the BB router 110. Moreover, the transceiver 211 emits electromagnetic waves therearound, thereby forming the communication area 131 to communicate wirelessly with the mobile terminal 140.

The mobile-terminal control unit 212 controls mobile terminals (the mobile terminal 140, and the like) in the communication area 131 through the transceiver 211. For example, mobile-terminal control unit 212 pages the mobile terminal 140 using the transceiver 211. Further, the mobile-terminal control unit 212 is a monitoring unit that monitors the IP address assigned to the mobile terminal 140 for the mobile communication network 102. The mobile-terminal control unit 212 causes the storage unit 214 to store the monitored IP address.

For example, the mobile-terminal control unit 212 picks up the IP address transmitted from the mobile communication network 102 and transferred to the mobile terminal 140 by the transceiver 211, thereby monitoring the IP address assigned to the mobile terminal 140 for the mobile communication network 102. Alternatively, the mobile communication network 102 can transmit the IP address assigned to the mobile terminal 140 to the indoor base station 130 in addition to the mobile terminal 140.

In this case, the mobile-terminal control unit 212 monitors the IP address assigned to the mobile terminal 140 by receiving the IP address transmitted from the mobile communication network 102 through the transceiver 211. Furthermore, the mobile-terminal control unit 212 obtains the UUID and the IMSI of the mobile terminal 140 through the transceiver 211. The mobile-terminal control unit 212 causes the storage unit 214 to store the combination information 132 indicating the combination of the obtained UUID and IMSI, and the monitored IP address of the mobile terminal 140.

The data terminal 213 receives the IP packet transmitted from the PC 120 and transferred by the BB router 110 through the transceiver 211. The indoor base station 130 outputs a combination of the UUID included in the received IP packet and the IP address set as the destination of the IP packet to the comparing unit 215.

Moreover, the data terminal 213 transmits, through the transceiver 211, the IP packet that is transmitted from the PC 120 and transferred by the BB router 110 to the mobile terminal 140 when "coincide" is output as a result of the comparison by the comparing unit 215. Furthermore, the data terminal 213 performs error processing when "differ" is output as a result of the comparison.

The comparing unit 215 compares the combination output from the data terminal 213 and the combination information 132 that is stored in the storage unit 214. The comparing unit 215 outputs a result of the comparison to the data terminal 213. The mobile-terminal control unit 212, the data terminal 213, and the comparing unit 215 may be implemented by, for example, a central processing unit (CPU).

Figure 3:
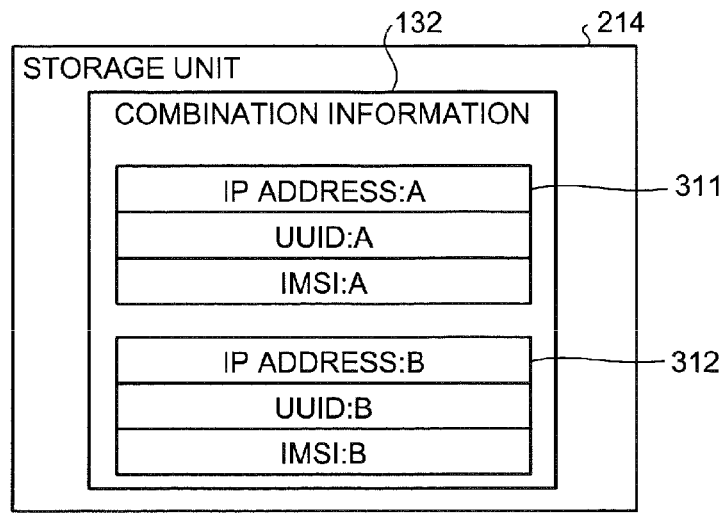
FIG. 3 is a schematic diagram depicting one example of combination information depicted in FIG. 2.

FIG. 3 is a schematic diagram depicting one example of the combination information depicted in FIG. 2. The mobile-terminal control unit 212 stores a combination of an IP address, a UUID, and an IMSI for each mobile terminal located in the communication area 131, as the combination information 132 (combinations 311 and 312). The mobile-terminal control unit 212 updates the IP address of the combination information 132 when the IP address of a mobile terminal in the communication area 131 has changed.

If the mobile terminal 140 can generate its own UUID (for example, when the mobile terminal 140 supports UPnP), the indoor base station 130 obtains the UUID of the mobile terminal 140 when the mobile terminal 140 is connected to the UPnP network. For example, the indoor base station 130 obtains the UUID of the mobile terminal 140 by monitoring UPnP interworking or data from the mobile terminal 140.

If the mobile terminal 140 cannot generate its own UUID the indoor base station 130 generates a UUID for the mobile terminal 140 when the mobile terminal 140 is connected to the UPnP network. Because the IMSI is identification information unique to the mobile terminal 140, the indoor base station 130 obtains the IMSI of the mobile terminal 140 from the mobile terminal 140.

Figure 4:
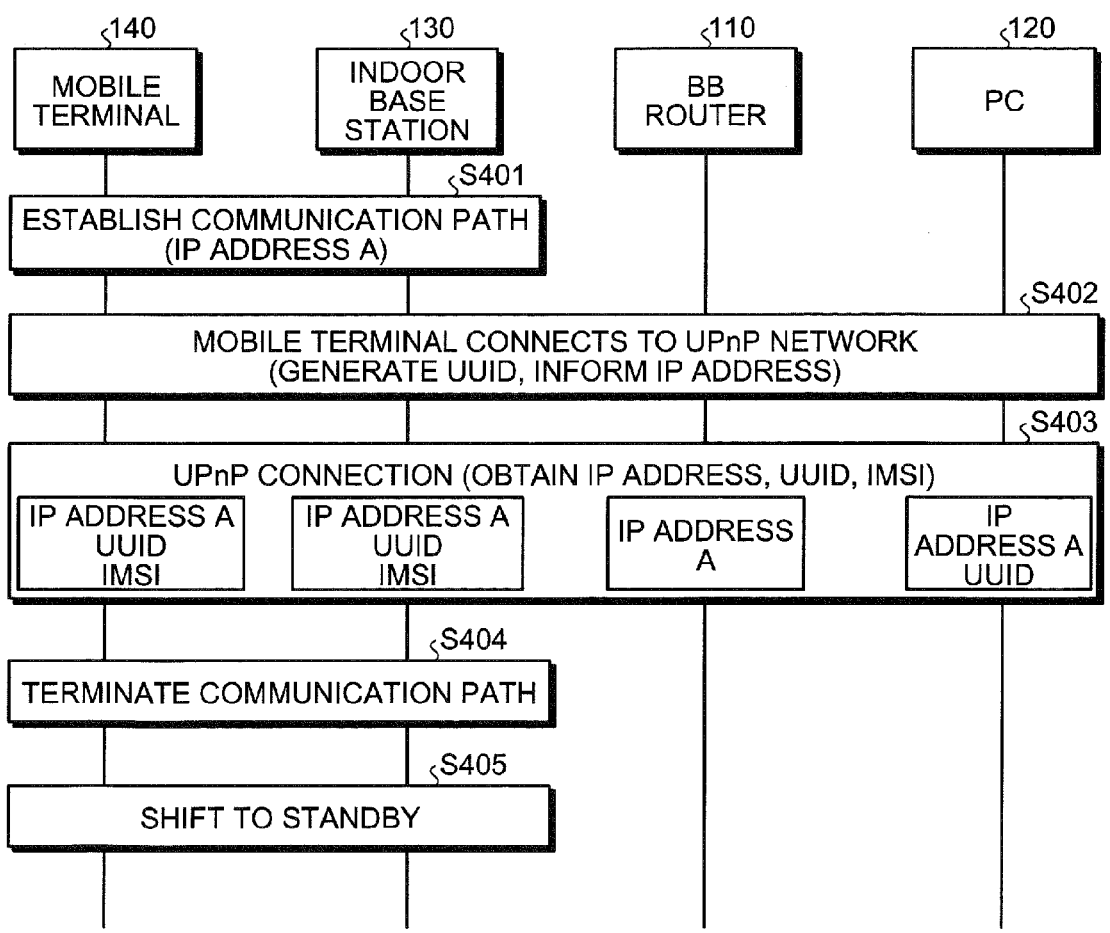
FIG. 4 is a sequence diagram depicting a pre-operation of the communication system according to the first embodiment.

FIG. 4 is a sequence diagram depicting a pre-operation of the communication system according to the first embodiment. It is assumed that the mobile terminal 140 has accessed the UPnP network including the BB router 110, the PC 120, and the indoor base station 130 in the past. First, the mobile terminal 140 and the indoor base station 130 establish a communication path therebetween by 3GPP procedure (step S401). At this time, an IP address A is issued from the mobile communication network 102, and the IP address A is assigned to the mobile terminal 140 by the 3GPP procedure.

Subsequently, the mobile terminal 140 is connected to the UPnP network (step S402). Specifically, the mobile terminal 140 transmits, to the BB router 110, the PC 120, and the indoor base station 130 on the UPnP network, an IP broadcast packet to establish a connection to the UPnP network and informs that the mobile terminal 140 has connected to the UPnP network. At this time, a description uniform resource locator (URL) is included in the IP broadcast packet.

The description URL is a URL to access a device in which information concerning the mobile terminal 140 is stored. Next, the BB router 110, the PC 120, and the indoor base station 130 on the UPnP network perform UPnP connection to the mobile terminal 140 (step S403). Specifically, the BB router 110, the PC 120, and the indoor base station 130 can obtain the information concerning the mobile terminal 140 by accessing the description URL included in the IP broadcast packet.

In this example, the BB router 110 obtains the IP address A of the mobile terminal 140. The PC 120 obtains the IP address A and the UUID of the mobile terminal 140. At this time, the PC 120 stores the obtained IP address A as the address for the mobile terminal 140.

Furthermore, the indoor base station 130 obtains the IP address A, the UUID, and the IMSI of the mobile terminal 140. At this time, the indoor base station 130 stores the combination information 132 in the storage unit 214. Subsequently, the mobile terminal 140 and the indoor base station 130 terminate the communication path established at step S401 if there is no communication (step S404). Next, the mobile terminal 140 shifts to a standby state (step S405), and a series of the pre-operation ends.

Figure 5:
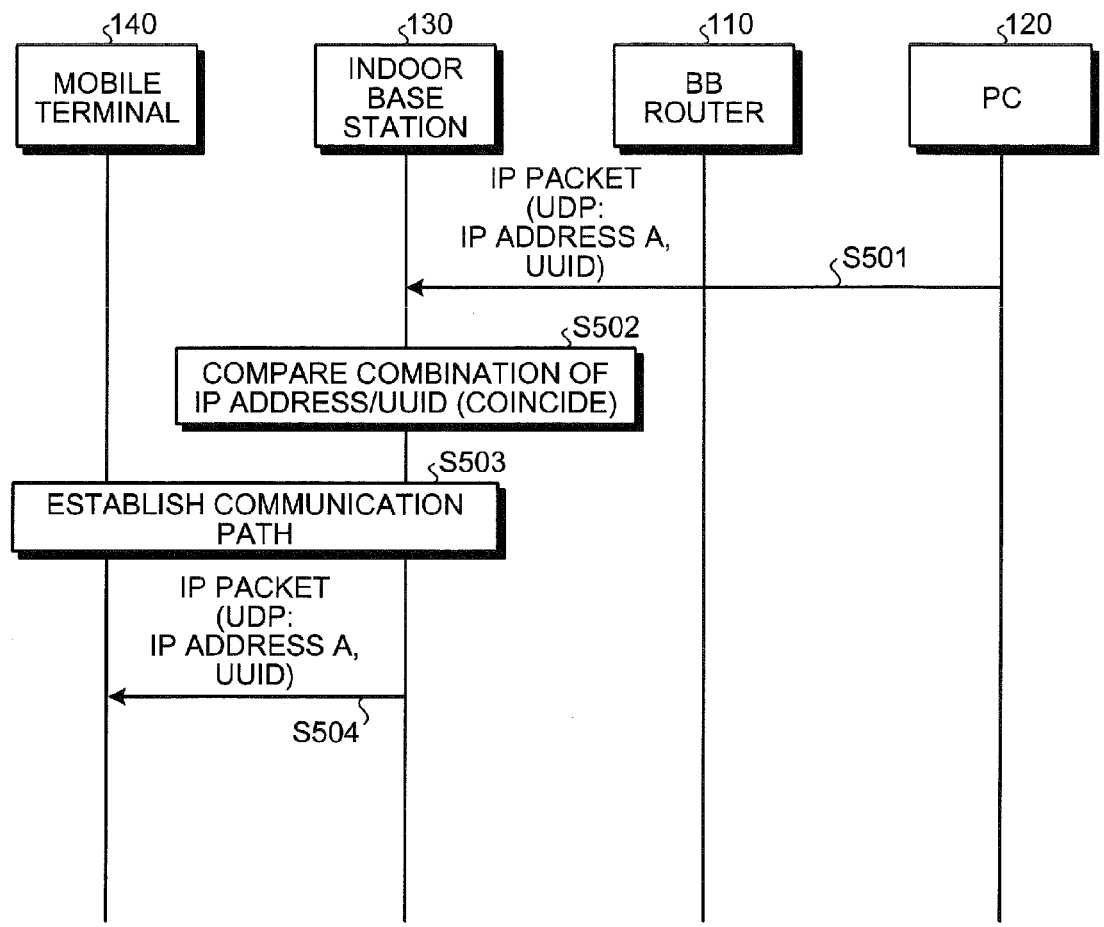
FIG. 5 is a sequence diagram of one example of a transmission operation (universal datagram protocol (UDP), addresses coinciding) of the communication system according to the first embodiment.

FIG. 5 is a sequence diagram of one example of a transmission operation (universal datagram protocol (UDP), addresses coinciding) of the communication system according to the first embodiment. In FIG. 5, a case is explained where the IP address (IP address A) stored by the PC 120 as the address of the mobile terminal 140 coincides with the latest IP (IP address A) address.

Moreover, it is assumed that the mobile terminal 140 is in standby (see step S405 in FIG. 4). After the pre-operation depicted in FIG. 4, the PC 120 transmits, by UDP, the IP packet addressed to the IP address A stored as the IP address of the mobile terminal 140 (step S501).

The IP packet transmitted at step S501 includes the UUID of the mobile terminal 140 and is received by the BB router 110. The BB router 110 determines that the received IP packet is addressed to the indoor base station 130, and transmits the received IP packet to the indoor base station 130.

Subsequently, the indoor base station 130 compares the combination of the IP address A set as the destination of the received IP packet and the UUID included in the IP packet with the combination information 132 (step S502). In this example, it is assumed that the respective combinations coincide. Next, the indoor base station 130 pages the mobile terminal 140 using the IMSI thereof, thereby establishing a communication path with the mobile terminal 140 (step S503).

The paging at step S503 is performed based on the 3GPP procedure. By the process at step S503, communication between the PC 120 and the mobile terminal 140 is enabled at an IP level. The indoor base station 130 then transmits, by UDP, the IP packet received at step S501 to the mobile terminal 140 (step S504), and a series of the transmission operation ends.

FIG. 6 is a sequence diagram of a first example of a transmission operation (UDP, addresses differing) of the communication system according to the first embodiment. In FIG. 6, a case is explained where the IP address (IP address A) stored by the PC 120 as the address of the mobile terminal 140 differs from the latest IP (IP address B) address. Processes at steps S601 and S602 are identical to those at steps S501 and S502 (see FIG. 5), respectively; hence, explanation thereof is omitted.

Here, it is assumed that the comparison at step S602 indicates that the combination of the IP address A set as the destination of the received IP packet and the UUID included in the IP packet and the combination information 132 do not coincide. Next, the indoor base station 130 notifies the PC 120 of the new address, i.e., the IP address B that, in the combination information 132, is combined with the UUID included in the IP packet received at step S601 (step S603).

The PC 120 stores the IP address B provided at step S603 as the address of the mobile terminal 140. Subsequently, the PC 120 transmits, by UDP, an IP packet addressed to the IP address B provided at step S603 (step S604). The IP packet transmitted at step S604 is received by the indoor base station 130 through the BB router 110.

Next, the indoor base station 130 performs paging using the IMSI of the mobile terminal 140, thereby establishing a communication path with the mobile terminal 140 (step S605). The indoor base station 130 then transmits, by UDP and to the mobile terminal 140, the IP packet received at step S604 (step S606), and a series of the transmission operation ends.

As described, when the comparison at step S602 indicates that the respective combinations do not coincide, the IP address that, in the combination information 132, is combined with the UUID included in the received IP packet is provided as a new address to the PC 120. Thus, the PC 120 can obtain the latest IP address of the mobile terminal 140 and can re-transmit the IP packet using the obtained IP address.

The PC 120 can automatically obtain the latest IP address when the PC 120 transmits an IP packet to the mobile terminal 140 and the IP address is wrong. Therefore, compared to a case where the PC 120 regularly monitors the latest IP address of the mobile terminal 140, the processing load of the PC 120 and communication traffic between the PC 120 and the indoor base station 130 can be reduced.

Figure 7:
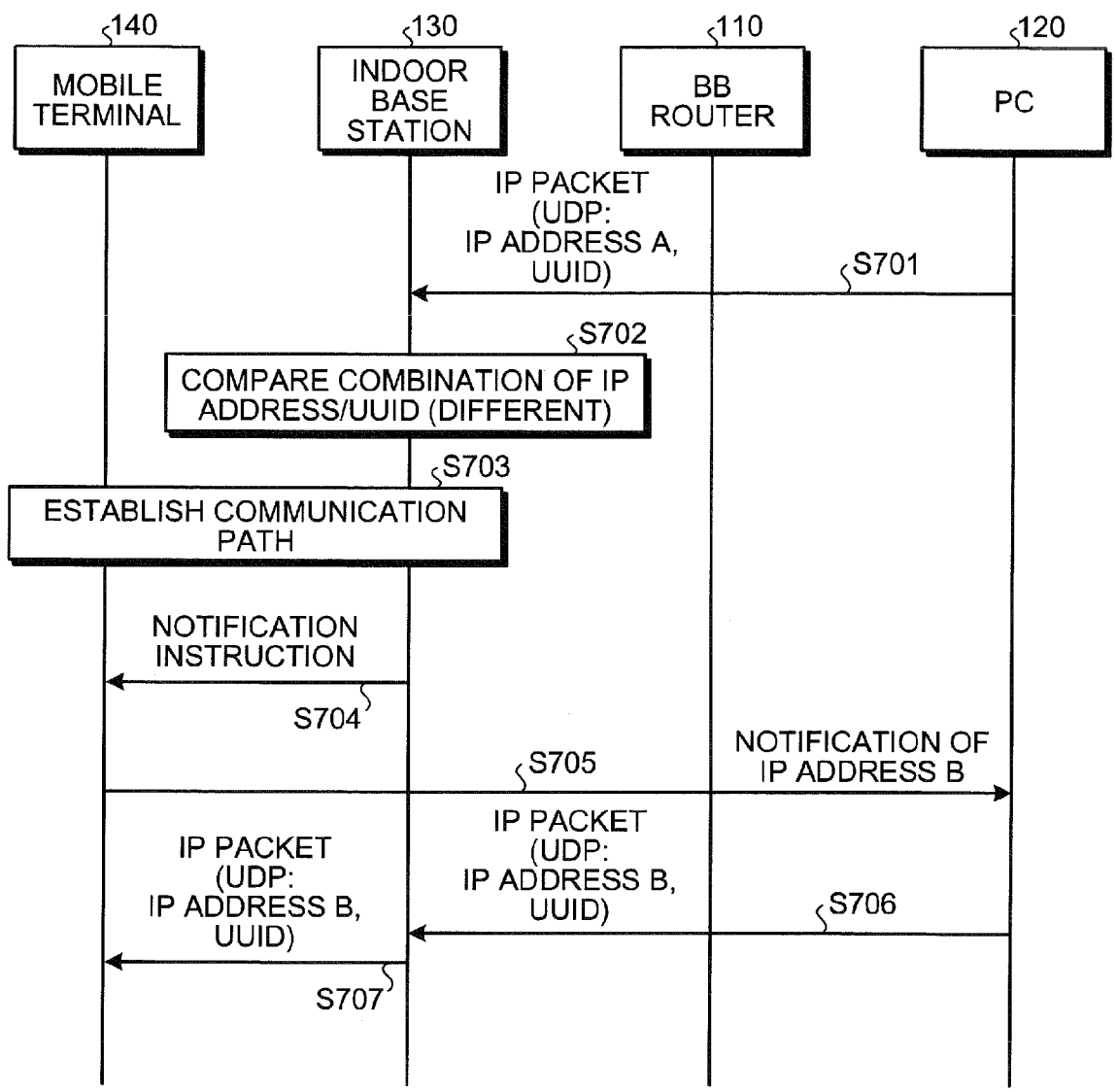
FIG. 7 is a sequence diagram of a second example of a transmission operation (UDP, addresses differing) of the communication system according to the first embodiment.

FIG. 7 is a sequence diagram of a second example of a transmission operation (UDP, addresses differing) of the communication system according to the first embodiment. In FIG. 7, a case is explained where the IP address (IP address A) stored by the PC 120 as the address of the mobile terminal 140 differs from the latest IP (IP address B) address.

Processes at steps S701 and S702 are identical to those at steps S501 and S502 (see FIG. 5), respectively; hence, explanation thereof is omitted. Here, it is assumed that the comparison at step S702 indicates that the combination of the IP address A set as the destination of the received IP packet and the UUID included in this IP packet and the combination information 132 do not coincide.

Next, the indoor base station 130 performs paging by using IMSI of the mobile terminal 140, thereby establishing a communication path with the mobile terminal 140 (step S703). The indoor base station 130 then transmits, to the mobile terminal 140 that corresponds to the UUID included in the IP packet received at step S702, a notification instruction instructing to notify the PC 120 of the IP address B of the mobile terminal 140 (step S704).

Subsequently, according to the notification instruction transmitted at step S704, the mobile terminal 140 notifies the PC 120 of the latest IP address B assigned thereto (step S705). The PC 120 stores the IP address B provided at step S705 as the address of the mobile terminal 140.

The PC 120 then transmits, by UDP, the IP packet addressed to the IP address B provided at step S705 (step S706). The IP packet transmitted at step S706 is received by the indoor base station 130. Next, the indoor base station 130 transmits, by UDP, the IP packet received at step S706 to the mobile terminal 140 (step S707), and a series of the transmission operation ends.

As described, when the comparison at step S702 indicates that the respective combinations do not coincide, a notification instruction instructing to notify the PC 120 of the IP address B of the mobile terminal 140 is transmitted to the mobile terminal 140. Thus, the PC 120 can obtain the latest IP address of the mobile terminal 140 and can re-transmit the IP packet using the obtained IP address.

The PC 120 can automatically obtain the latest IP address when the PC 120 transmits an IP packet to the mobile terminal 140 and the IP address is wrong. Therefore, compared to a case where the PC 120 regularly monitors the latest IP address of the mobile terminal 140, the processing load of the PC 120 and communication traffic between the PC 120 and the indoor base station 130 can be reduced.

Figure 8:
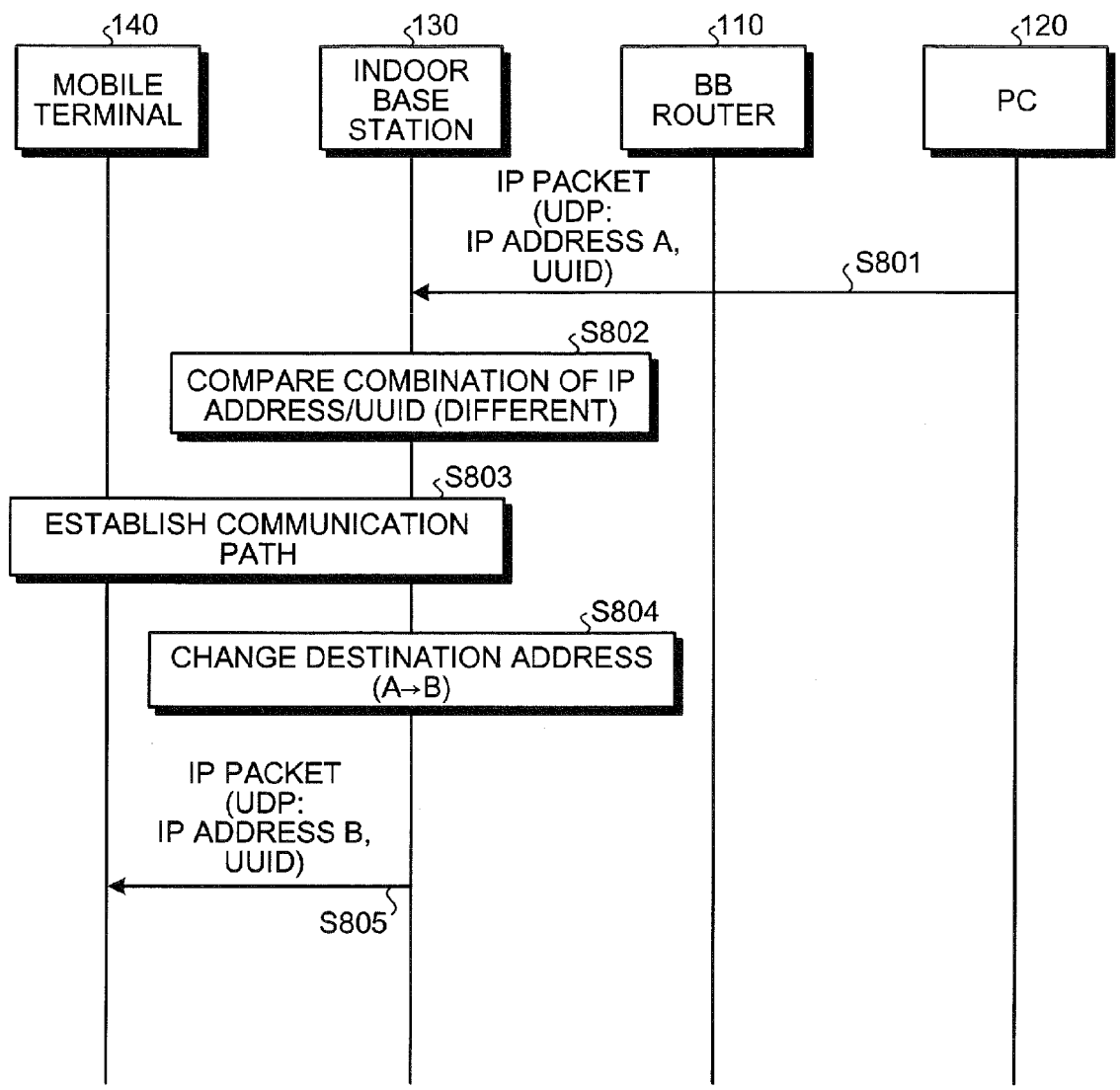
FIG. 8 is a sequence diagram of a third example of a transmission operation (UDP, addresses differing) of the communication system according to the first embodiment.

FIG. 8 is a sequence diagram of a third example of a transmission operation (UDP, addresses differing) of the communication system according to the first embodiment. In FIG. 8, a case is explained where the IP address (IP address A) stored by the PC 120 as the address of the mobile terminal 140 differs from the latest IP (IP address B) address.

Processes at steps S801 and S802 are identical to those at steps S501 and S502 (see FIG. 5), respectively; hence, explanation thereof is omitted. Here, it is assumed that the comparison at step S802 indicates that respective combinations do not coincide. Next, the indoor base station 130 performs paging by using IMSI of the mobile terminal 140, thereby establishing a communication path with the mobile terminal 140 (step S803).

Next, the indoor base station 130 changes the destination address of the received IP packet to the IP address B that, in the combination information 132, is combined with the UUID included in the IP packet received at step S801 (step S804). Subsequently, the indoor base station 130 transmits the IP packet whose destination has been changed at step S804 to the mobile terminal 140 (step S805), and a series of the transmission operation ends.

As described, when the comparison at step S802 indicates that the respective combinations do not coincide with each other, the destination of the IP packet is changed to the IP address that, in the combination information 132, is combined with the UUID included in the received IP packet, and the IP packet whose destination has been changed is transmitted to the mobile terminal 140.

Thus, even if the IP address of the IP packet that is transmitted to the mobile terminal 140 is wrong, the IP packet can be transferred to the mobile terminal 140 without going through the PC 120. Therefore, the processing load of the PC 120 and communication traffic between the PC 120 and the indoor base station 130 can be reduced, and an IP packet having an incorrect destination address can be transferred speedily to the mobile terminal 140.

As described, according to the indoor base station 130 of the first embodiment, the combination information 132 including the monitored IP address of the mobile terminal 140 and the UUID of the mobile terminal 140 is stored, and the combination of the destination address of the IP packet transmitted from the PC 120 and the UUID included in the IP packet is compared with the combination information 132, thereby detecting an incorrect destination address of the IP packet.

Furthermore, when an incorrect destination address of an IP packet is detected, the latest IP address of the mobile terminal 140 can be identified from the UUID included in the IP packet and the combination information 132. Therefore, even if the IP address assigned to the mobile terminal 140 has changed and the PC 120 does not always have the IP address after the change, the IP packet transmitted from the PC 120 can be transmitted to the mobile terminal 140.

The IP packet can be transmitted to the mobile terminal 140; hence, even if the IP address assigned to the mobile terminal has changed, the mobile terminal 140 can arbitrarily connect to and disconnected from the UPnP network including the BB router 110, the PC 120, and the indoor base station 130. Therefore, PnP of the mobile terminal with respect to the UPnP network can be implemented.

Furthermore, without adding a particular function to a communication device on the side of the mobile communication network 102 or to the PC 120, an IP packet can be transmitted to the mobile terminal 140 even when the IP address assigned to the mobile terminal 140 has changed. Therefore, communication between the PC 120 and the mobile terminal 140, and PnP of the mobile terminal 140 can be achieved at a low cost.

Although in this example, the UUID of the mobile terminal 140 is used as identification information of the mobile terminal 140 to be combined with the IP address in the combination information 132, the identification information of the mobile terminal 140 is not limited to the UUID. For example, the IMSI of the mobile terminal 140 or a combination of the UUID and the IMSI can be used as the identification information of the mobile terminal 140 (similarly in a second embodiment and a third embodiment). Furthermore, when the UUID is used as the identification information, information that does not change over the course of time, such as a node area, is preferably used as the identification information.

A functional configuration and a pre-operation of the communication system 100 according to the second embodiment, and a functional configuration of the indoor base station 130 are the same as those of the first embodiment, and explanation therefor is omitted. While in the first embodiment, a case where an IP packet is transmitted between the PC 120 and the mobile terminal 140 using UDP has been explained, in the second embodiment, a case where an IP packet is transmitted between the PC 120 and the mobile terminal 140 using a transmission control protocol (TCP) is explained.

Figure 9:
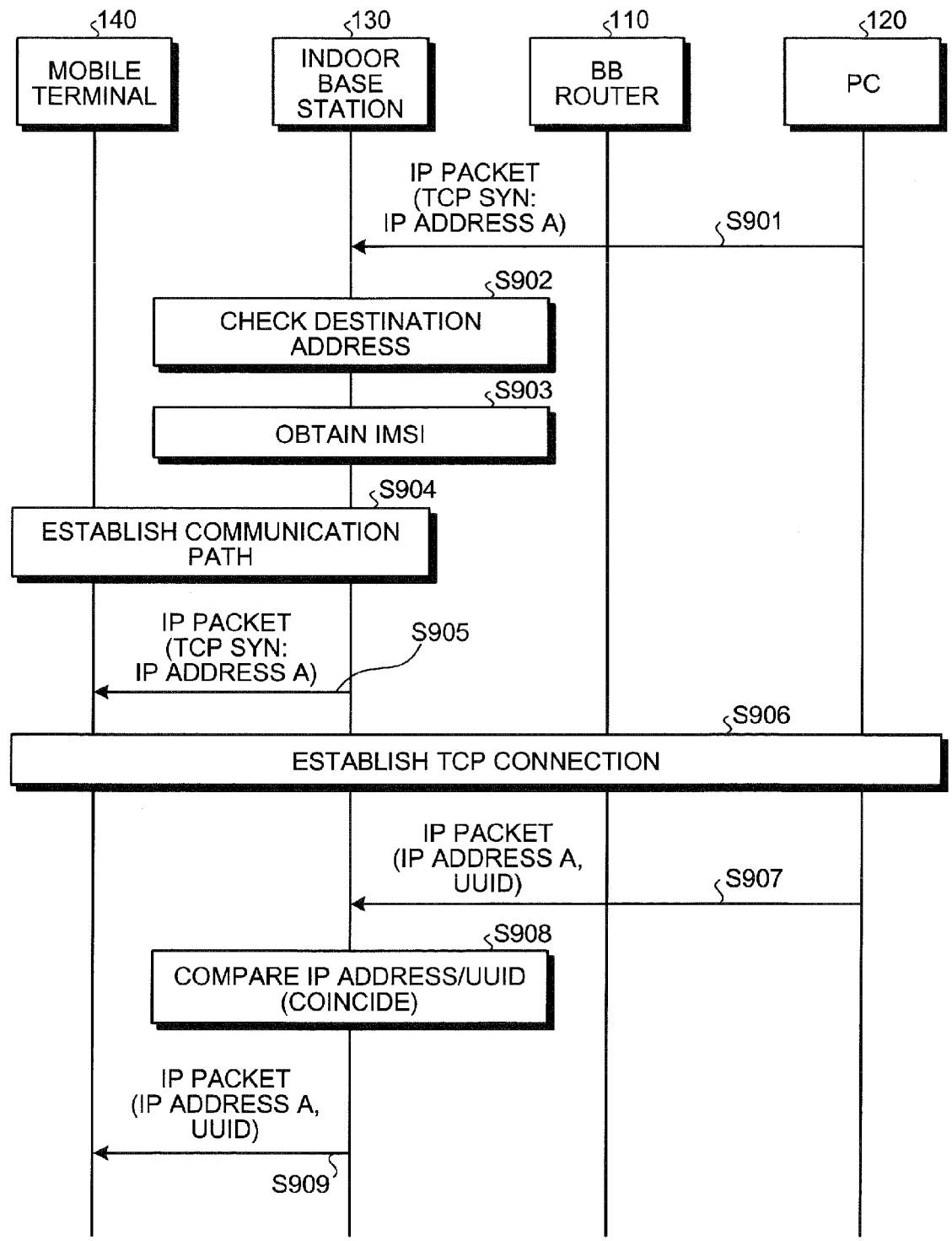
FIG. 9 is a sequence diagram of one example of a transmission operation (transmission control protocol (TPC), addresses coinciding) of the communication system according to the second embodiment.

FIG. 9 is a sequence diagram of one example of a transmission operation (TPC, addresses coinciding) of the communication system according to the second embodiment. In FIG. 9, a case is explained where the IP address (IP address A) stored by the PC 120 as the address of the mobile terminal 140 coincides with the latest IP (IP address A) address.

Further, it is assumed that the mobile terminal 140 is in standby. After the pre-operation depicted in FIG. 4, the PC 120 transmits, by TCP, the IP packet (SYN message) addressed to the IP address A that is stored therein as the IP address of the mobile terminal 140 (step S901).

The SYN message transmitted at step S901 is a communication path establishment request for TCP handshake processing (same for SYN messages below). The indoor base station 130 receives the IP packet transmitted at step S901. The IP packet transmitted at step S901 does not include the UUID of the mobile terminal 140.

Next, the indoor base station 130 checks whether the destination address of the IP packet received at step S901 is among the combination information 132 (step S902). It is assumed that the destination address of the IP packet is among the combination information 132. Subsequently, in the combination information 132, the IMSI that is combined with the destination address of the IP packet received at step S901 is obtained (step S903).

Next, the indoor base station 130 performs paging by using the IMSI obtained at step S903, thereby establishing a communication path with the mobile terminal 140 (step S904). The indoor base station 130 then transmits, by TCP, the IP packet (SYN message) received at step S901 to the mobile terminal 140 (step S905).

Next, the mobile terminal 140 and the PC 120 establish the TCP connection (step S906). Subsequently, the PC 120 transmits the IP packet addressed to the IP address A stored therein as the IP address of the mobile terminal 140 (step S907). The indoor base station 130 receives the IP packet transmitted at step S907. The IP packet transmitted at step S907 includes the UUID of the mobile terminal 140.

Next, the indoor base station 130 compares a combination of the IP address A that is set as the destination of the IP packet received at step S907 and the UUID included in the IP packet with the combination information 132 (step S908). It is assumed that combinations coincide. The indoor base station 130 then transmits the IP packet received at step S907 to the mobile terminal 140 (step S909), and a series of the transmission operation ends.

If the destination address of the IP address is not among the combination information 132 at step S902, the IMSI cannot be obtained at step S903. Therefore, the indoor base station 130 transmits an error message to the PC 120 and cancels the transmission operation.

Figure 10:
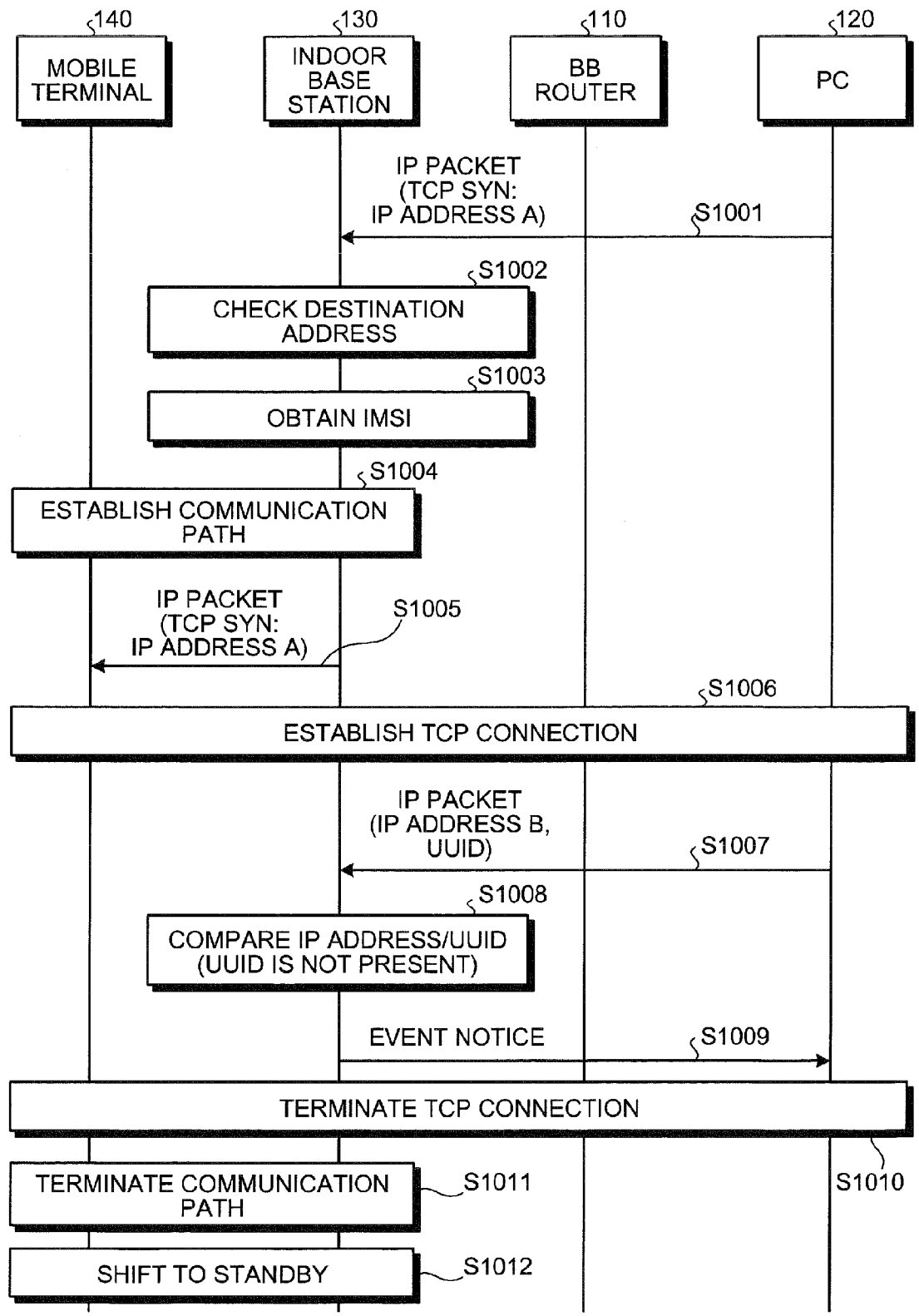
FIG. 10 is a sequence diagram of one example of a transmission operation (TCP, no UUID) of the communication system according to a second embodiment.

FIG. 10 is a sequence diagram of one example of a transmission operation (TCP, no UUID) of the communication system according to the second embodiment. In FIG. 10, a case is explained where the IP address (IP address A) stored by the PC 120 as the address of the mobile terminal 140 differs from the latest IP (IP address B) address.

Processes at steps S1001 to S1008 are identical to those at step S901 to S908 (see FIG. 9), and therefore, explanation therefor is omitted. It is assumed that the UUID included in the IP packet received at step S1007 is not among the combination information 132 at step S1008. The indoor base station 130 then transmits to the PC 120, an event notice indicating that the mobile terminal 140 having the IP address A is not present in the UPnP network (step S1009).

Subsequently, the indoor base station 130 terminates the TCP connection established between the indoor base station 130 and the mobile terminal (i.e., a mobile terminal other than the mobile terminal 140) at step S1006 (step S1010). Next, the indoor base station 130 terminates the communication path established between the indoor base station 130 and the mobile terminal 140 at step S1004 (step S1011). The mobile terminal 140 then shifts to a standby state (step S1012), and a series of the transmission operation ends.

Figure 11:
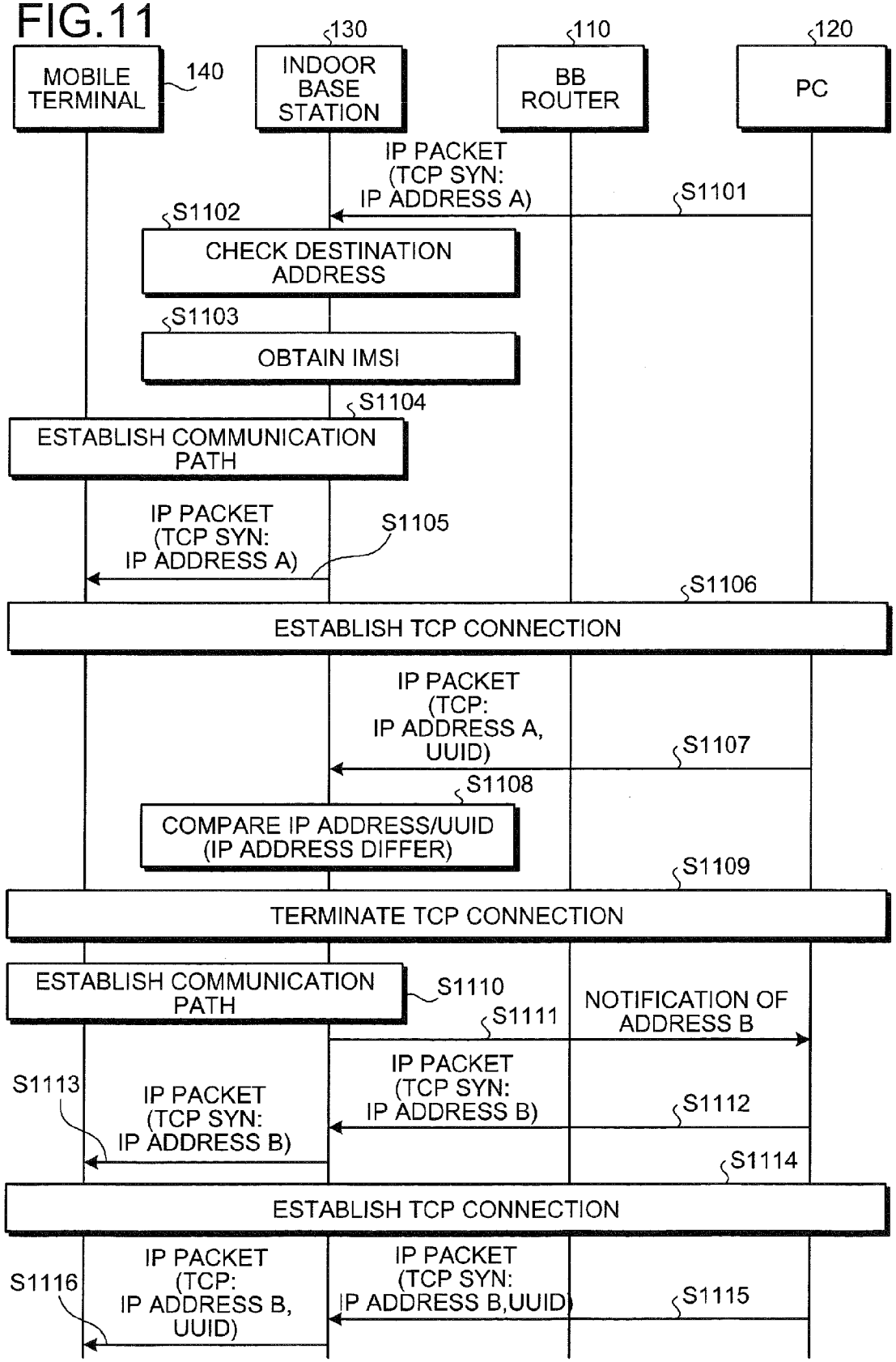
FIG. 11 is a sequence diagram of a first example of a transmission operation (TCP, addresses differing) of the communication system according to the second embodiment.

FIG. 11 is a sequence diagram of a first example of a transmission operation (TCP, addresses differing) of the communication system according to the second embodiment. In FIG. 11, a case is explained where the IP address (IP address A) stored by the PC 120 as the address of the mobile terminal 140 differs from the latest IP (IP address B) address.

Processes at steps S1101 to S1108 are the identical to those at steps S901 to S908 (see FIG. 9), and therefore, explanation therefor is omitted. It is assumed that the comparison at step S1108 indicates that the combinations do not coincide. In this case, it is found that the mobile terminal with which the TCP connection is established by the PC 120 at step S1106 is a mobile terminal other than the mobile terminal 140. The PC 120 then terminates the TCP connection established between the PC 120 and the mobile terminal (a mobile terminal other than the mobile terminal 140) at step S1106 (step S1109).

Next, the indoor base station 130 performs paging by using the IMSI that, in the combination information 132, is combined with the destination address of the IP packet received at step S1107, thereby establishing a communication path between the indoor base station 130 and the mobile terminal 140 (step S1110). Subsequently, the indoor base station 130 informs the PC 120 of the IP address B that, in the combination information 132, is combined with the UUID included in the IP packet received at step S1107, as the new address (step S1111).

Next, the PC 120 transmits, by TCP, the IP packet (SYN message) addressed to the IP address B provided at step S1111 (step S1112). The indoor base station 130 receives the IP packet transmitted at step S1112. The indoor base station 130 then transmits, by TCP, the IP packet (SYN message) received at step S1112 to the mobile terminal 140 (step S1113).

Next, the mobile terminal 140 and the PC 120 establish the TCP connection (step S1114). The PC 120 then transmits, by TCP, the IP packet addressed to the IP address B provided at step S1111 (step S1115). The indoor base station 130 receives the IP packet transmitted at step S1115. Subsequently, the indoor base station 130 transmits, by TCP, the IP packet received at step S1115 to the mobile terminal 140 (step S1116), and a series of the transmission operation ends.

As described, in the TCP communication, an SYN message is transmitted prior to the transmission of an IP packet including data. Therefore, the IP packet (SYN message) received at step S1101 cannot include the UUID of the mobile terminal 140. The indoor base station 130 transfers the IP packet (SYN message) to the destination address without determining whether the destination address of the IP packet received at step S1101 is correct, and establishes the TCP connection between the mobile terminal and the PC 120.

Thus, the IP packet including the UUID of the mobile terminal 140 can be transmitted from the PC 120 as described for step S1107. When it is found that the respective combinations do not coincide with each other as a result of the comparison at step S1108, the TCP connection with the wrong mobile terminal is terminated, and the TCP connection is established between the mobile terminal 140 and the PC 120.

Thus, even with TCP transmission, similar to the transmission operation depicted in FIG. 6, the PC 120 can automatically obtain the latest IP address when the PC 120 transmits an IP packet to the mobile terminal 140 and the IP address is wrong. Therefore, compared to a case where the PC 120 regularly monitors the latest IP address of the mobile terminal 140, the processing load of the PC 120 and communication traffic between the PC 120 and the indoor base station 130 can be reduced.

Figure 12:
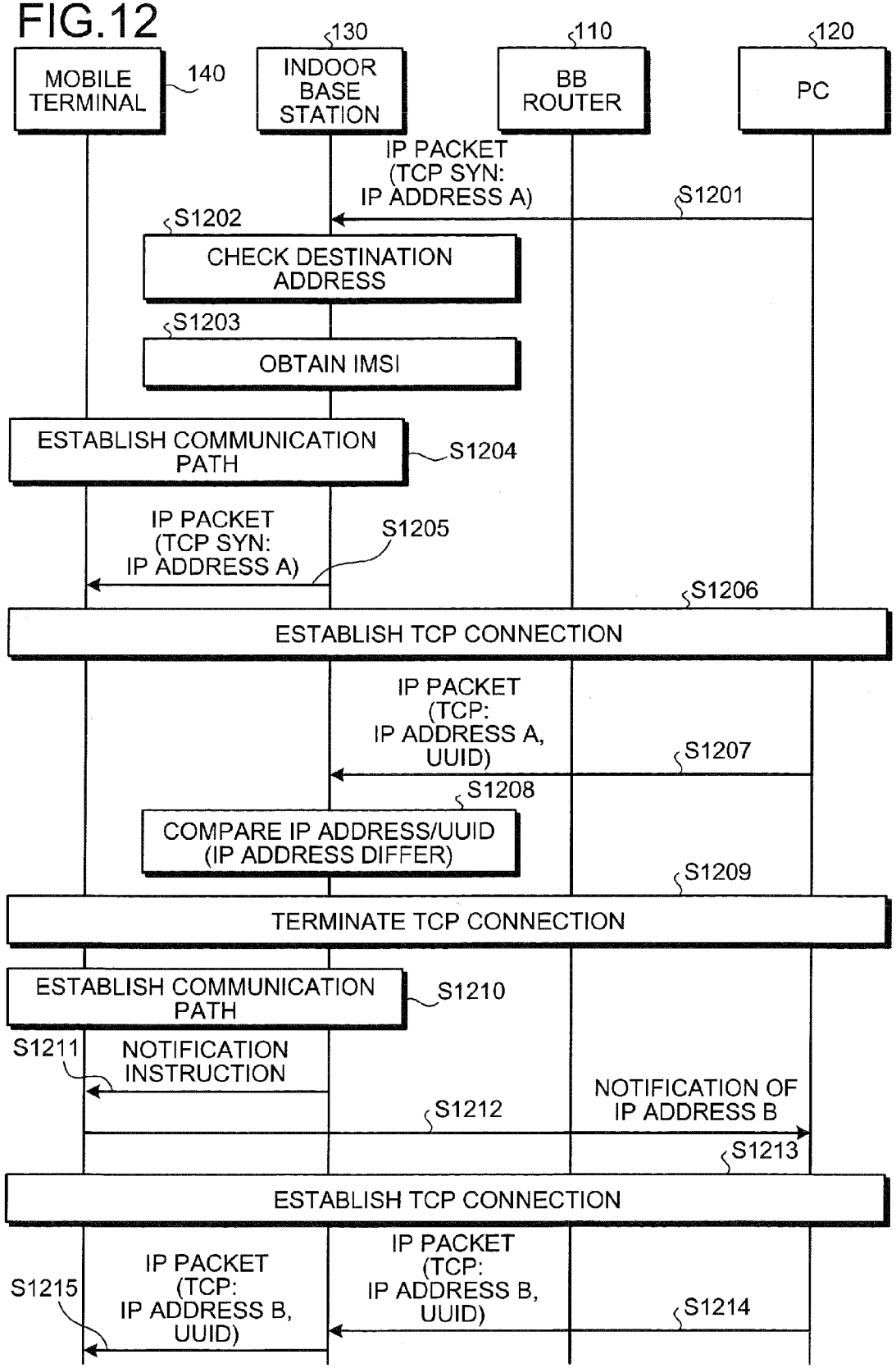
FIG. 12 is a sequence diagram of a second example of a transmission operation (TCP, addresses differing) of the communication system according to the second embodiment.

FIG. 12 is a sequence diagram of a second example of a transmission operation (TCP, addresses differing) of the communication system according to the second embodiment. In FIG. 12, a case is explained where the IP address (IP address A) stored by the PC 120 as the address of the mobile terminal 140 differs from the latest IP (IP address B) address.

Processes at steps S1201 to S1208 are the identical to those at steps S901 to S908 (see FIG. 9), and therefore, explanation therefor is omitted. It is assumed that the comparison at step S1208 indicates that the combinations do not coincide. In this case, it is found that the mobile terminal with which the TCP connection is established by the PC 120 at step S1206 is a mobile terminal other than the mobile terminal 140.

The PC 120 then terminates the TCP connection established between the PC 120 and the mobile terminal (a mobile terminal other than the mobile terminal 140) at step S1206 (step S1209). Next, the indoor base station 130 performs paging by using the IMSI that, in the combination information 132, is combined with the UUID included in the IP packet received at step S1207, thereby establishing a communication path between the indoor base station 130 and the mobile terminal 140 (step S1210).

Next, the indoor base station 130 transmits, to the mobile terminal 140, notification instruction instructing to inform the PC 120 of the latest IP address assigned to the mobile terminal 140 (step S1211). Subsequently, the mobile terminal 140 informs the PC 120 of the latest IP address B (step S1212). The TCP connection between the mobile terminal 140 and the PC 120 is then established (step S1213).

Next, the PC 120 transmits, by TCP, the IP packet addressed to the IP address B provided at step S1212 (step S1214). The indoor base station 130 receives the IP packet transmitted at step S1214 and transmits, by TCP, the IP packet received to the mobile terminal 140 (step S1215), and a series of the transmission operation ends.

As described, in the TCP communication, an SYN message is transmitted prior to the transmission of an IP packet including data. Therefore, the IP packet (SYN message) received at step S1201 cannot include the UUID of the mobile terminal 140. The indoor base station 130 transfers the IP packet (SYN message) to the destination address without determining whether the destination address of the IP packet received at step S1201 is correct, and establishes the TCP connection between the mobile terminal and the PC 120.

Thus, the IP packet including the UUID of the mobile terminal 140 can be transmitted from the PC 120 as described for step S1207. When it is found that the respective combinations do not coincide with each other as a result of the comparison at step S1208, the TCP connection with the wrong mobile terminal is terminated, and the TCP connection is established between the mobile terminal 140 and the PC 120.

Thus, even with TCP transmission, similar to the transmission operation depicted in FIG. 7, the PC 120 can automatically obtain the latest IP address when the PC 120 transmits an IP packet to the mobile terminal 140 and the IP address is wrong. Therefore, compared to a case where the PC 120 regularly monitors the latest IP address of the mobile terminal 140, the processing load of the PC 120 and communication traffic between the PC 120 and the indoor base station 130 can be reduced.

Figure 13:
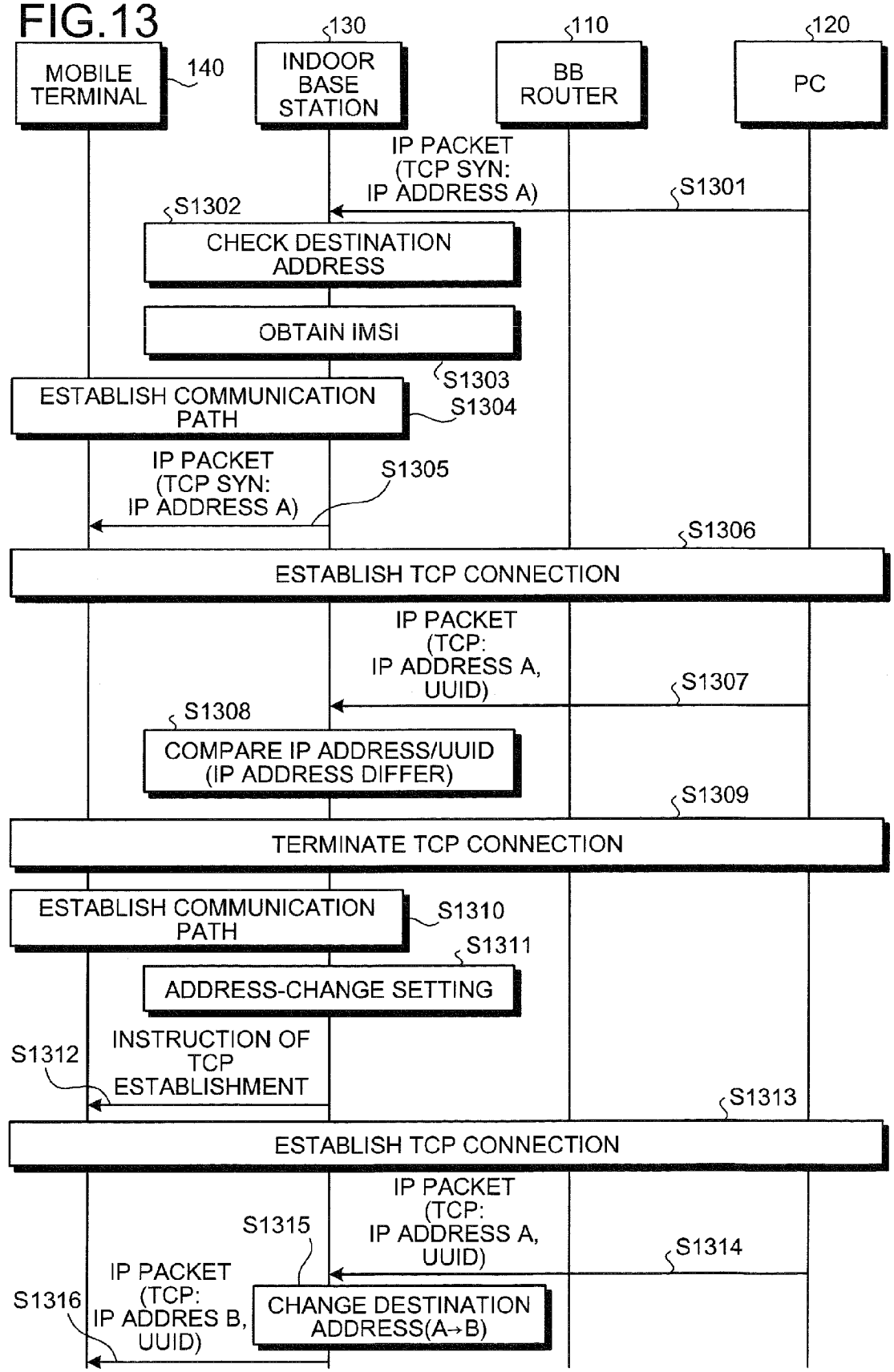
FIG. 13 is a sequence diagram of a third example of a transmission operation (TCP, addresses differing) of the communication system according to the second embodiment.

FIG. 13 is a sequence diagram of a third example of a transmission operation (TCP, addresses differing) of the communication system according to the second embodiment. In FIG. 13, a case is explained where the IP address (IP address A) stored by the PC 120 as the address of the mobile terminal 140 differs from the latest IP (IP address B) address.

Processes at steps S1301 to S1308 are the identical to those at steps S901 to S908 (see FIG. 9), and therefore, explanation therefor is omitted. It is assumed that the comparison at step S1308 indicates that the combinations do not coincide. In this case, it is found that the mobile terminal with which the TCP connection is established by the PC 120 at step S1306 is a mobile terminal other than the mobile terminal 140.

The PC 120 then terminates the TCP connection established between the PC 120 and the mobile terminal (a mobile terminal other than the mobile terminal 140) at step S1306 (step S1309). Next, the indoor base station 130 performs paging by using the IMSI that, in the combination information 132, is combined with the UUID included in the IP packet received at step S1307, thereby establishing a communication path between the indoor base station 130 and the mobile terminal 140 (step S1310).

Next, the indoor base station 130 performs an address-change setting to change the destination address of the received IP address from the IP address A to the IP address B when the indoor base station 130 receives the IP packet addressed to the IP address A in the combination information 132 (step S1311). Subsequently, the indoor base station 130 transmits, to the mobile terminal 140, a TCP establishment instruction instructing to establish the TCP connection with the PC 120, (step S1312).

Next, the mobile terminal 140 establishes the TCP connection with the PC 120 based on the TCP establishment instruction received at step S1312 (step S1313). The PC 120 then transmits the IP packet addressed to the IP address A that is stored therein as the IP address of the mobile terminal 140 (step S1314). The indoor base station 130 receives the IP packet transmitted at step S1314.

Next, the indoor base station 130 changes the destination address of the IP address received at step S1314 from the IP address A to IP address B based on the change setting set at step S1311 (step S1315). The indoor base station 130 then transmits, by TCP and to the mobile terminal 140, the IP packet whose destination address has been changed at step S1315 (step S1316), and a series of the transmission operation ends.

As described, in the TCP communication, an SYN message is transmitted prior to the transmission of an IP packet including data. Therefore, the IP packet (SYN message) received at step S1301 cannot include the UUID of the mobile terminal 140. The indoor base station 130 transfers the IP packet (SYN message) to the destination address without determining whether the destination address of the IP packet received at step S1301 is correct, and establishes the TCP connection between the mobile terminal and the PC 120.

Thus, the IP packet including the UUID of the mobile terminal 140 can be transmitted from the PC 120 as described for step S1307. When it is found that the respective combinations do not coincide with each other as a result of the comparison at step S1308, the TCP connection with the wrong mobile terminal is terminated, and the TCP connection is established between the mobile terminal 140 and the PC 120.

Thus, also in the TCP communication, similarly to the transmission operation depicted in FIG. 8, even when the IP address of the IP packet transmitted from the PC 120 to the mobile terminal 140 is wrong, the IP packet can be transferred to the mobile terminal 140 without re-transmission of the IP packet by the PC 120.

As described, according to the indoor base station 130 of the second embodiment, also in the TCP communication, similarly to the indoor base station 130 of the first embodiment, an erroneous destination address of the IP packet can be detected by comparing a combination of the destination address of the IP packet transmitted from the PC 120 and the UUID included in the IP packet with the combination information 132.

Moreover, even if the IP address assigned to the mobile terminal 140 has changed and the PC 120 does not always have the IP address after the change, the IP packet transmitted from the PC 120 can be transmitted to the mobile terminal 140. Therefore, PnP of the mobile terminal with respect to the UPnP network can be facilitated.

A functional configuration and a pre-operation of the communication system 100 according to the third embodiment are the same as those of the first embodiment, and explanation therefor is omitted. While in the second embodiment, a case where an IP packet is transmitted between the PC 120 and the mobile terminal 140 using TCP has been explained, in the third embodiment, a case where TCP connection between the PC 120 and the mobile terminal 140 is terminated by the indoor base station 130 is explained.

Figure 14:
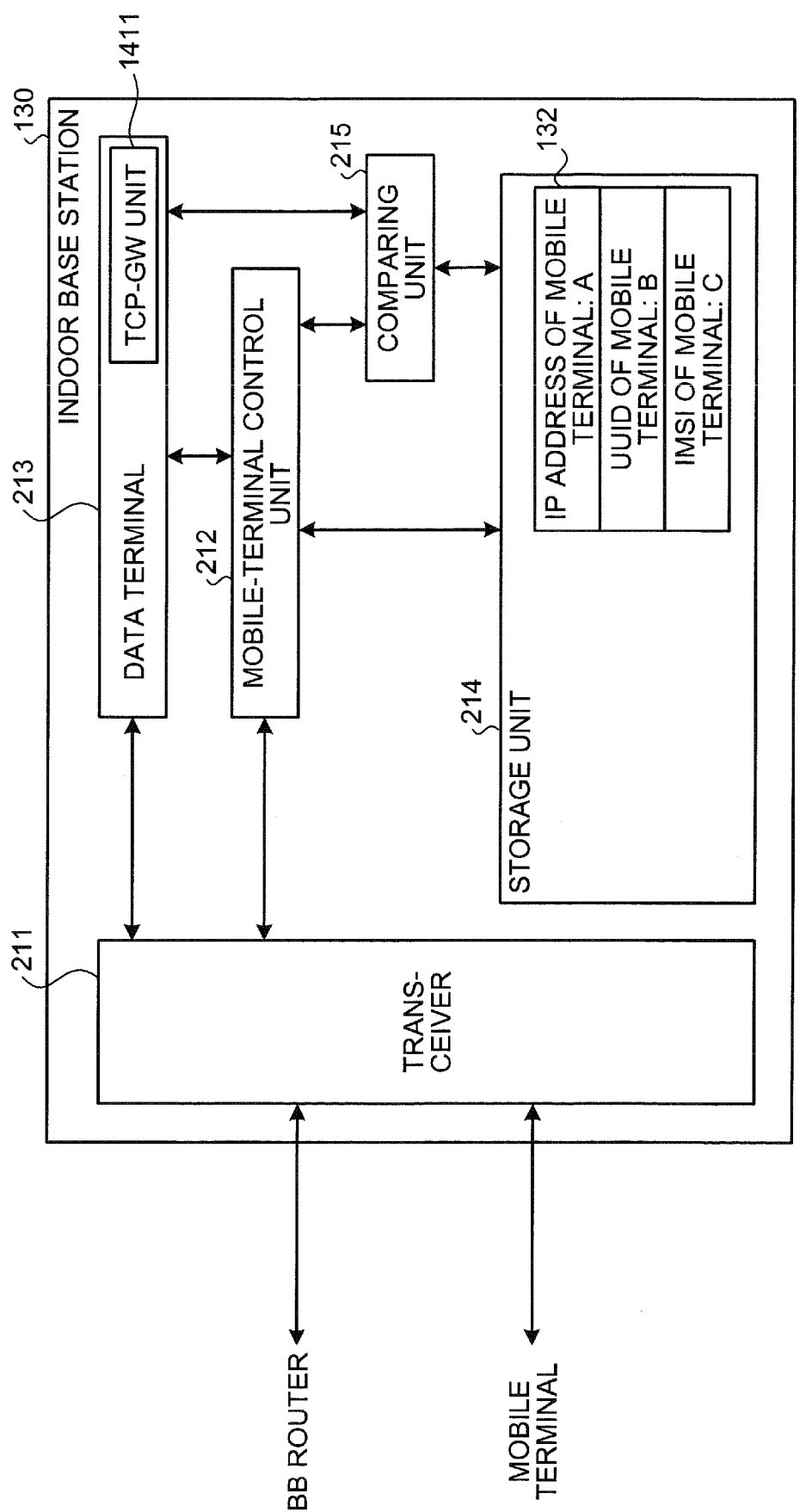
FIG. 14 is a block diagram of an indoor base station according to a third embodiment.

FIG. 14 is a block diagram of an indoor base station according to the third embodiment. In FIG. 14, like reference numerals refer to like parts in the configuration depicted in FIG. 2, and explanation therefor is omitted. As depicted in FIG. 14, the data terminal 213 of the indoor base station 130 according to the third embodiment includes a TCP-GW unit 1411. The TCP-GW unit 1411 has a function of terminating the TCP connection between the PC 120 and the mobile terminal 140.

When the transceiver 211 receives an IP packet (SYN message) from the PC 120 to a mobile terminal (not necessarily the mobile terminal 140), the TCP-GW unit 1411 terminates the TCP connection between the PC 120 and the mobile terminal based on the received IP packet (SYN message), and establishes TCP connection between the TCP-GW unit 1411 and the PC 120. As a result of the establishment of the TCP connection with the PC 120 by the TCP-GW unit 1411, the data terminal 213 receives data transmitted from the PC 120.

Figure 15:
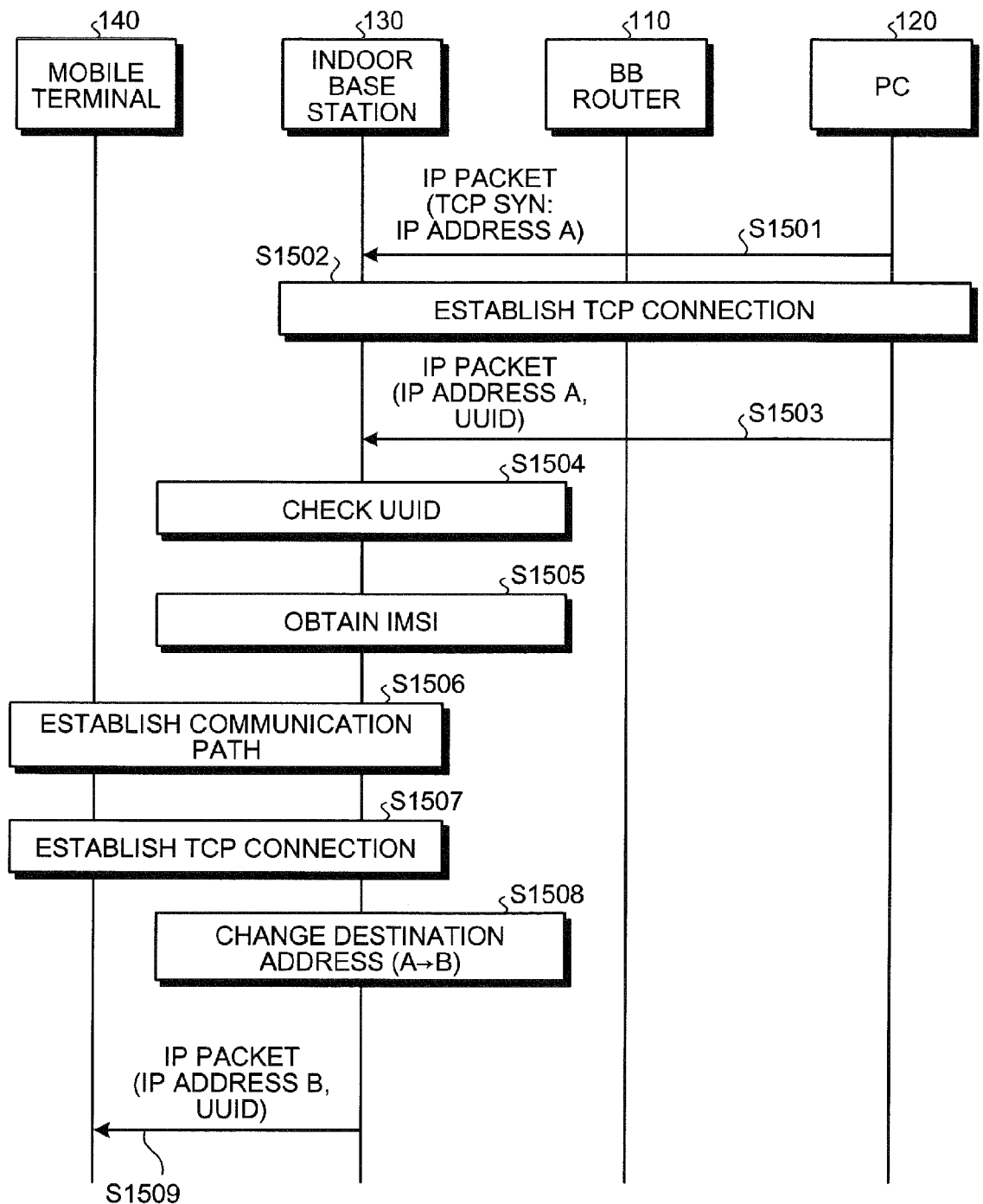
FIG. 15 is a sequence diagram of one example of a transmission operation (TCP) of the communication system according to the third embodiment.

FIG. 15 is a sequence diagram of one example of a transmission operation (TCP) of the communication system according to the third embodiment. In FIG. 15, a case is explained where the IP address (IP address A) stored by the PC 120 as the address of the mobile terminal 140 differs from the latest IP (IP address B) address.

After the pre-operation depicted in FIG. 4, the PC 120 transmits, by TCP, the IP packet (SYN message) addressed to the IP address A that is stored the PC 120 as the IP address of the mobile terminal 140 (step S1501). The indoor base station 130 receives the IP packet transmitted at step S1501. The IP packet transmitted at step S1501 does not include the UUID of the mobile terminal 140.

Next, the indoor base station 130 terminates the TCP connection between the PC 120 and the mobile terminal 140, and establishes TCP connection with the PC 120 (step S1502). Next, the PC 120 transmits, by TCP, the IP packet addressed to the IP address A that is stored in the PC 120 as the IP address of the mobile terminal 140 (step S1503). The indoor base station 130 receives the IP packet transmitted at step S1503. The IP packet transmitted at step S1503 includes the UUID of the mobile terminal 140.

Subsequently, the indoor base station 130 checks whether the UUID included in the IP packet received at step S1503 is among the combination information 132 (step S1504). It is assumed that the UUID is among the combination information 132. Next, the indoor base station 130 obtains the IMSI that, in the combination information 132, is combined with the UUID included in the IP packet received at step S1503 (step S1505).

The indoor base station 130 then performs paging by using the IMSI obtained at step S1505, thereby establishing a communication path between the indoor base station 130 and the mobile terminal 140 (step S1506). Subsequently, the indoor base station 130 establishes TCP connection with the mobile terminal 140 (step S1507).

Next, the indoor base station 130 changes the destination address of the received IP packet to the IP address B that, in the combination information 132, is combined with the UUID included in the IP packet received at step S1503 (step S1508). The indoor base station 130 then transmits the IP packet whose destination address has been changed at step S1508 to the mobile terminal 140 (step S1509), and a series of the transmission operation ends.

As described, the indoor base station 130 terminates the TCP connection between the PC 120 and a mobile terminal (not necessarily the mobile terminal 140) based on the received IP packet (SYN), and establishes TCP connection with the PC 120. When the respective combinations do not coincide with each other, the indoor base station 130 changes the destination address of the IP packet to the IP address that, in the combination information 132, is combined with the UUID included in the received IP packet. The IP packet whose destination has been changed is then transmitted to the mobile terminal 140.

Thus, also in the TCP communication, even when the IP address of the IP packet transmitted from the PC 120 addressed to the mobile terminal 140 is wrong, the IP packet can be transferred to the mobile terminal 140 without going through the PC 120. Therefore, the processing load of the PC 120 and communication traffic between the PC 120 and the indoor base station 130 can be reduced, and the IP packet with an incorrect destination address can be transferred speedily to the mobile terminal 140.

As described, according to the indoor base station 130 of the third embodiment, the TCP connection between the PC 120 and a mobile terminal (not necessarily the mobile terminal 140) is terminated based on the received IP packet (SYN), and TCP connection can be established with the PC 120 irrespective of whether the destination address of the IP packet (SYN) is correct. Thus, the IP packet including the UUID of the mobile terminal 140 can be transmitted from the PC 120.

The combination information 132 of the monitored IP address of the mobile terminal 140 and the UUID of the mobile terminal 140 is stored and compared with the combination of the destination address of the IP packet transmitted from the PC 120 and the UUID included in the IP packet, thereby detecting an erroneous destination address of the IP packet.

Furthermore, even if the destination address of the IP address is incorrect, the destination address can be changed to the latest IP address using the UUID included in the IP packet and the combination information 132, and the IP packet whose destination address has changed can be transmitted to the mobile terminal 140. Therefore, even if the IP address assigned to the mobile terminal 140 has changed and the PC 120 does not always have the IP address after the change, the IP packet transmitted from the PC 120 can be transferred to the mobile terminal 140.

Because transmission of an IP packet to the mobile terminal 140 from the PC 120 is possible, even if the IP address assigned to the mobile terminal 140 has changed, connection and disconnection of the mobile terminal 140 to and from the UPnP network including the BB router 110, the PC 120, and the indoor base station 130 can be arbitrarily performed. Therefore, PnP of the mobile terminal 140 with respect to the UPnP network can be implemented easily.

Figure 16:
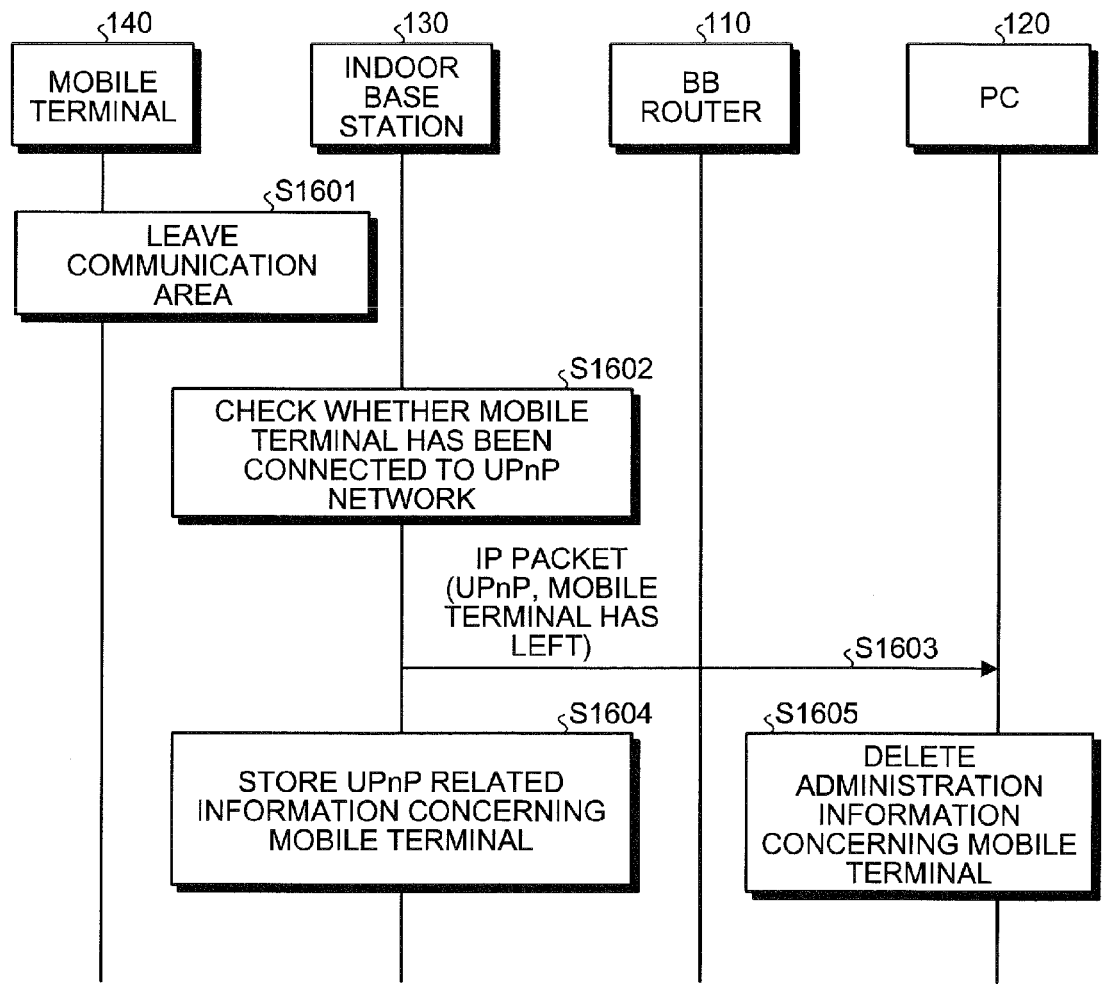
FIG. 16 is a sequence diagram of one example of an operation of the communication system when the mobile terminal leaves a communication area.

FIG. 16 is a sequence diagram of one example of an operation of the communication system when the mobile terminal leaves the communication area. First, it is assumed that the mobile terminal 140 leaves the communication area 131 in the first to the third embodiments described above (step S1601). When the leaving of the mobile terminal 140 from the communication area 131 is detected, the indoor base station 130 checks whether the mobile terminal 140 is a mobile terminal that has been connected to the UPnP network (step S1602).

In this example, because the mobile terminal 140 is a mobile terminal that has been connected to the UPnP network, the indoor base station 130 informs, by an IP packet, the BB router 110 and the PC 120 also constituting the UPnP network that the mobile terminal 140 has left the communication area 131 (step S1603).

The information at step S1603 is executed, for example, by using GENA. Next, the indoor base station 130 stores UPnP related information (UUID, IMSI, etc.) of the mobile terminal 140 in the storage unit 214 (step S1604). Furthermore, the PC 120 deletes administration information (IP address, etc.) concerning the mobile terminal 140 (step S1605), and a series of the operation ends.

When the mobile terminal 140 again enters the communication area 131, the indoor base station 130 executes UPnP connection with respect to the mobile terminal 140 using the UPnP related information stored at step S1604 and concerning the mobile terminal 140.

As described above, according to the base station and the data transfer method disclosed herein, even if the address assigned to a mobile terminal (the mobile terminal 140) changes, an erroneous destination address of data (IP packet) transmitted from a communication terminal (the PC 120) in an local network (the LAN 101) to the mobile terminal can be detected. This enables transmission of data that is transmitted from the communication terminal to the mobile terminal, even if the destination address assigned to the mobile terminal has changed. Thus, PnP of the mobile terminal to the UPnP network is implemented.

While in the above embodiments, explanation has been given using the PC 120 as a communication terminal having a communication function in the LAN 101 as an example, the communication terminal in the LAN 101 is not limited to the PC 120, and can be any electronic device that has a communication function in the LAN 101, such as a home appliance having a communication function.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A base station that forms a communication area enabling communication with a mobile communication network through a local network that includes the base station, the base station comprising:
    a monitoring unit that monitors an address assigned to a mobile terminal in the communication area, the address being assigned by the mobile communication network for data communication with the mobile communication network;

a storage unit that stores combination information indicating a combination of the address monitored at the monitoring unit and identification information of the mobile terminal;
a receiving unit that receives, from a communication terminal in the local network, data having the identification information;
a comparing unit that compares the combination information stored in the storage unit with a combination of a destination address of the data and the identification information that is included in the data received by the receiving unit; and
a transmitting unit that transmits, to the mobile terminal, the data received by the receiving unit when a result of comparison by the comparing unit indicates that the combination of the destination address and the identification information and the combination information coincide, and performs error processing when the result of comparison indicates that the combination of the destination address and the identification information and the combination information do not coincide.

2. The base station according to claim 1, wherein the transmitting unit, in performing the error processing, informs the communication terminal that the destination address of the received data is invalid.

3. The base station according to claim 1, wherein the transmitting unit, in performing the error processing, provides the communication terminal with an address that, in the combination information, is combined with the identification information included in the data received.

4. The base station according to claim 3, wherein the receiving unit receives data transmitted from the communication terminal addressed to the address provided to the communication terminal by the transmitting unit, and the transmitting unit transmits to the mobile terminal, the data that is received by the receiving unit and addressed to the address provided to the communication terminal by the transmitting unit.

5. The base station according to claim 1, wherein the transmitting unit, in performing the error processing, transmits notification instruction to the mobile terminal, the notification instruction instructing to provide the communication terminal with an address that, in the combination information, is combined with the identification information included in the data received.

6. The base station according to claim 5, wherein the receiving unit receives data that is transmitted from the communication terminal addressed to the address provided to the communication terminal by the mobile terminal as a result of transmission of the notification instruction by the transmitting unit, and the transmitting unit transmits, to the mobile terminal, the data that is received by the receiving unit and addressed to the address provided to the communication terminal by the transmitting unit.

7. The base station according to claim 1, further comprising a processor unit configured to, when the result of comparison indicates that the combination of the destination address and the identification information and the combination information do not coincide, change the destination address of the data to an address that, in the combination information, is combined with the identification included in the data received by the receiving unit, wherein the transmitting unit, in performing the error processing, transmits to the mobile terminal, the data whose address has been changed by the processor unit.

8. The base station according to claim 1, further comprising:
a request receiving unit that, prior to reception of the data, receives a communication-path establishment request from the communication terminal to the mobile terminal; and
a processor unit configured to establish transmission control protocol connection between the mobile terminal and the communication terminal, the mobile terminal being an intended recipient of the communication-path establishment request received by the request receiving unit,
wherein the receiving unit receives data that is transmitted from the communication terminal as a result of the transmission control protocol connection being established by the processor unit.

9. The base station according to claim 8, wherein the processor unit, when the result of comparison by the comparing unit indicates that the combination of the destination address and the identification information and the combination information do not coincide, terminates the transmission control protocol connection and establishes a transmission control protocol connection between the communication terminal and a mobile terminal having the address that is combined with the identification information included in the data received by the receiving unit.

10. The base station according to claim 1, further comprising:
a request receiving unit that, prior to reception of the data, receives a communication-path establishment request from the communication terminal to the mobile terminal; and
a processor unit configured to terminate a transmission control protocol connection between the communication terminal and the mobile terminal based on the communication-path establishment request received by the request receiving unit, and establishes a transmission control protocol connection with the communication terminal,
wherein the receiving unit receives data that is transmitted from the communication terminal as a result of the transmission control protocol connection being established by the processor unit.

11. The base station according to claim 10, further comprising a processor unit configured to, when the result of comparison indicates that the combination of the destination address and the identification information and the combination information do not coincide, changes the destination address of the data to an address that, in the combination information, is combined with the identification included in the data received by the receiving unit, wherein the transmitting unit, in performing the error processing, transmits to the mobile terminal, the data whose address has been changed by the processor unit.

12. A data transfer method of a base station that forms a communication area enabling communication with a mobile communication network through a local network that includes the base station, the data transfer method comprising:
monitoring an address assigned to a mobile terminal in the communication area, the address being assigned by the mobile communication network for data communication with the mobile communication network;
storing combination information indicating a combination of the address monitored by the monitoring unit and identification information of the mobile terminal;
receiving, from a communication terminal in the local network, data having the identification information;

comparing the combination information stored at the storing with a combination of a destination address of the data and the identification information that is included in the data received;

transmitting the data received at the receiving to the mobile terminal when a result of comparison at the comparing indicates that the combination of the destination address and the identification information and the combination information coincide; and performing error processing when the result of comparison at the comparing indicates that the combination of the destination address and the identification information and the combination information do not coincide.

\* \* \* \* \*